US012232111B2

(12) United States Patent
Huang et al.

(10) Patent No.: US 12,232,111 B2
(45) Date of Patent: Feb. 18, 2025

(54) DEMODULATION REFERENCE SIGNAL FOR FULL-DUPLEX COMMUNICATION

(71) Applicant: QUALCOMM Incorporated, San Diego, CA (US)

(72) Inventors: Min Huang, Beijing (CN); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 334 days.

(21) Appl. No.: 17/597,121

(22) PCT Filed: Jul. 4, 2019

(86) PCT No.: PCT/CN2019/094658
§ 371 (c)(1),
(2) Date: Dec. 27, 2021

(87) PCT Pub. No.: WO2021/000312
PCT Pub. Date: Jan. 7, 2021

(65) Prior Publication Data
US 2022/0287062 A1    Sep. 8, 2022

(51) Int. Cl.
*H04W 72/1273*    (2023.01)
*H04L 1/00*    (2006.01)
(Continued)

(52) U.S. Cl.
CPC ....... *H04W 72/1273* (2013.01); *H04L 1/0067* (2013.01); *H04L 5/0051* (2013.01);
(Continued)

(58) Field of Classification Search
CPC ......... H04W 72/1273; H04W 72/0446; H04W 72/0453; H04W 88/14; H04L 1/0067; H04L 5/0051; H04L 5/14
(Continued)

(56) References Cited

U.S. PATENT DOCUMENTS 10,505,698 B2 * 12/2019 Horiuchi ............... H04L 1/0001
11,272,491 B2 *  3/2022 Wu ....................... H04L 5/0023
(Continued)

FOREIGN PATENT DOCUMENTS

CN    104105120 A    10/2014
CN    109792739 A     5/2019

OTHER PUBLICATIONS

International Search Report and Written Opinion—PCT/CN2019/094658—ISA/EPO—Apr. 2, 2020.
(Continued)

*Primary Examiner* — Mong-Thuy T Tran
(74) *Attorney, Agent, or Firm* — QUALCOMM Incorporated

(57) ABSTRACT

Various aspects of the present disclosure generally relate to wireless communication. In some aspects, a base station (BS) may identify a collision between a data transmission and a demodulation reference signal (DMRS) transmission in a full-duplex time-frequency resource. The BS may transmit, to a wireless communication device, an indication of a time-frequency mapping for a zero-power DMRS (ZP-DMRS) in the full-duplex time-frequency resource. The time-frequency mapping for the ZP-DMRS, and a time-frequency mapping in the full-duplex time-frequency resource for the DMRS transmission, may be a same time-frequency mapping. Numerous other aspects are provided.

36 Claims, 13 Drawing Sheets

(51) Int. Cl.
*H04L 5/00* (2006.01)
*H04L 5/14* (2006.01)
*H04W 72/0446* (2023.01)
*H04W 72/0453* (2023.01)
*H04W 88/14* (2009.01)

(52) U.S. Cl.
CPC ........... *H04L 5/14* (2013.01); *H04W 72/0446* (2013.01); *H04W 72/0453* (2013.01); *H04W 88/14* (2013.01)

(58) Field of Classification Search
USPC ......................................................... 370/329
See application file for complete search history.

(56) References Cited

U.S. PATENT DOCUMENTS

| | | | | |
|---|---|---|---|---|
| 11,522,654 | B2* | 12/2022 | Su | ........................ H04L 5/0028 |
| 12,113,746 | B2* | 10/2024 | Panteleev | ............. H04L 5/0053 |
| 2014/0126404 | A1 | 5/2014 | Kim et al. | |
| 2014/0241273 | A1 | 8/2014 | Kim et al. | |
| 2015/0244436 | A1* | 8/2015 | Le-Ngoc | .............. H04B 7/0617 |
| | | | | 375/267 |
| 2016/0330011 | A1* | 11/2016 | Lee | ........................... H04L 5/14 |
| 2019/0158263 | A1 | 5/2019 | Lee et al. | |
| 2019/0174472 | A1 | 6/2019 | Lee et al. | |
| 2019/0349937 | A1* | 11/2019 | Kusashima | ............. H04W 72/20 |
| 2020/0154281 | A1* | 5/2020 | Muruganathan | ...... H04L 5/0094 |
| 2020/0314844 | A1* | 10/2020 | Tomeba | ................. H04W 88/10 |
| 2021/0044404 | A1* | 2/2021 | Liu | .................... H04W 72/0446 |
| 2021/0058219 | A1* | 2/2021 | Kimura | ...................... H04L 5/14 |
| 2022/0038248 | A1* | 2/2022 | Horiuchi | ................ H04L 5/0035 |

OTHER PUBLICATIONS

ZTE: "Discussion on Rate Matching" R1-1717420, 3GPP TSG RAN, WGI Meeting 90bis, 4 pages, Oct. 13, 2017 (Oct. 13, 2017), sections 1-4.

ZTE: "Discussion on Rate Matching", 3GPP Draft, 3GPP TSG RAN WG1 Meeting NR#3, R1-1715436 Discussion on Rate Matching, 3rd Generation Partnership Project (3GPP), Mobile Competence Centre, 650, Route Des Lucioles, F-06921 Sophia-Antipolls Cedex, France, vol. RAN WG1. No. Nagoya, Japan, Sep. 18, 2017-Sep. 21, 2017 Sep. 12, 2017 (Sep. 12, 2017), XP051329365, pp. 1-3, Retrieved from the Internet: URL:http://www.3gpp.org/ftp/tsg_ran/WG1_RL1/TSGR1_AH/NR_AH_1709/Docs/ [retrieved on Sep. 12, 2017] p. 1, paragraph 2, p. 2, paragraph 2.2.

ZTE: "On CSI-RS for CSI Acquisition", R1-1707129, 3GPP TSG RAN, WGI Meeting #89, 7 pages, May 19, 2017 (May 19, 2017), the whole document.

Supplementary European Search Report—EP19935856—Search Authority—The Hague—Feb. 27, 2023.

* cited by examiner

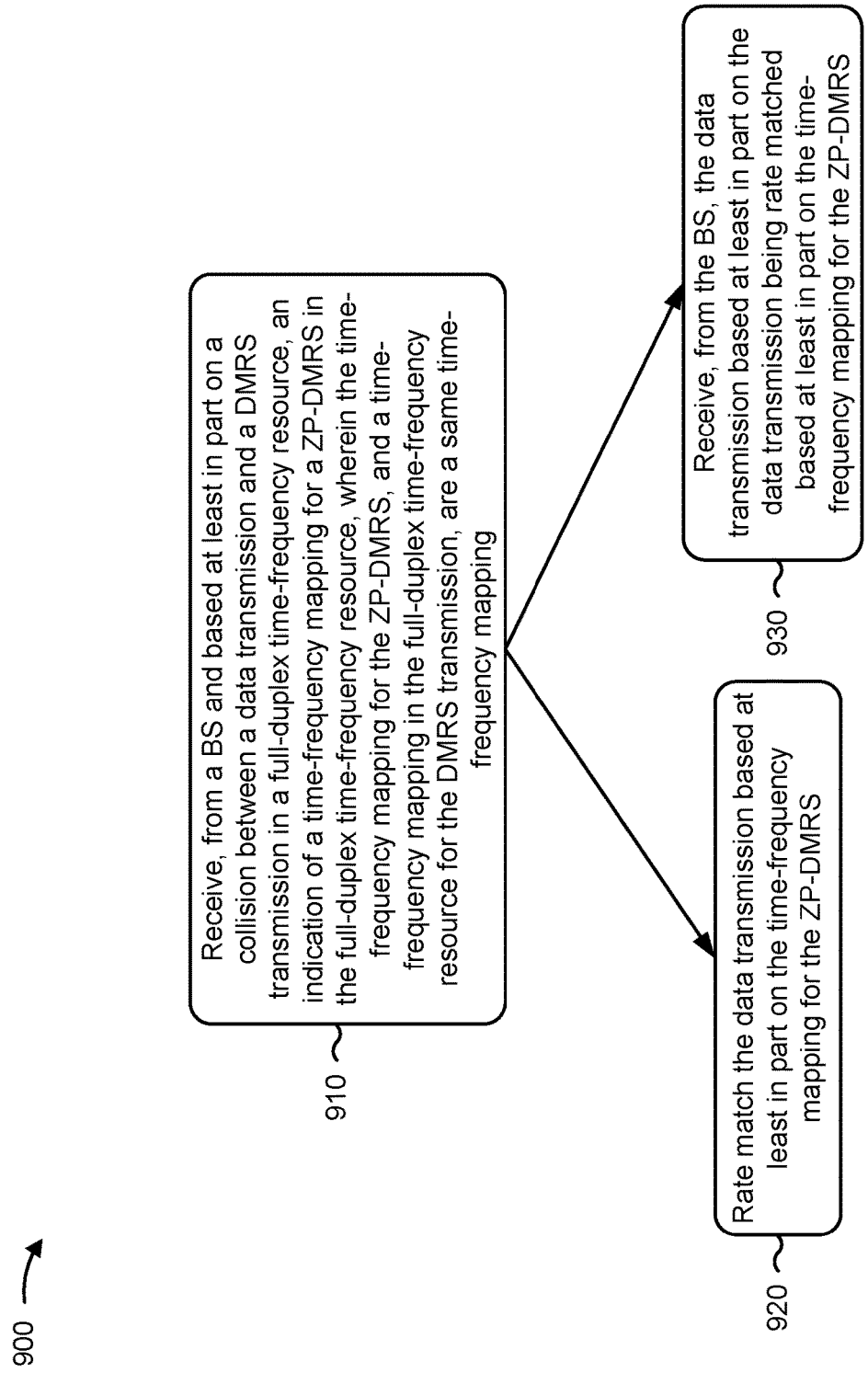

DEMODULATION REFERENCE SIGNAL FOR FULL-DUPLEX COMMUNICATION

CROSS-REFERENCE TO RELATED APPLICATION

This application is a 371 national stage of PCT Application No. PCT/CN2019/094658 filed on Jul. 4, 2019, entitled "DMRS FOR FULL-DUPLEX COMMUNICATION," which is hereby expressly incorporated by reference herein.

TECHNICAL FIELD

Aspects of the technology described below generally relate to wireless communication and to techniques and apparatuses for full-duplex communication using demodulation reference signals (DMRSs). Some techniques and apparatuses described herein enable and provide wireless communication devices and systems configured for low latency scenarios and increased throughput.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. A BS may be referred to as a Node B, a gNB, an access point (AP), a radio head, a transmit receive point (TRP), a new radio (NR) BS, a 5G Node B, and/or the like.

Multiple access technologies have been adopted in various telecommunication standards. Wireless communication standards provide common protocols to enable different devices (e.g., user equipment) to communicate on a municipal, national, regional, and even global level. New radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The purpose of the summary is to present some concepts of one or more aspects of the disclosure in summary form as a prelude to the more detailed description that is presented later.

Devices included in a full-duplex deployment in a wireless network may transmit and/or receive various types of full-duplex transmissions, such as data transmissions, demodulation reference signals (DMRSs), and/or the like. In some cases, a device may be scheduled to transmit a data transmission in the same time-frequency resource as a DMRS transmission that is scheduled to be transmitted by another device to the device. In some cases, interference with a DMRS transmission may occur where the DMRS transmission and a data transmission are transmitted in full duplex (e.g., where the DMRS transmission and the data transmission occur in the same full duplex time-frequency resource). In order to address such interference, one or more aspects described herein may include a device that may configure a zero-power DMRS (ZP-DMRS) in the time-frequency resources in which the DMRS transmission is to occur (e.g., in place of the data transmission that was to occur in the time-frequency resources). In this way, the ZP-DMRS reduces or prevents interference with the DMRS transmission, which improves DMRS-based channel estimation performance based at least in part on the DMRS transmission, improves signal reception and decoding performance, increases data throughput, and/or the like.

In some aspects, a method of wireless communication, performed by a base station (BS), may include identifying a collision between a data transmission and a DMRS transmission in a full-duplex time-frequency resource; and transmitting, to a wireless communication device, an indication of a time-frequency mapping for a ZP-DMRS in the full-duplex time-frequency resource, wherein the time-frequency mapping for the ZP-DMRS, and a time-frequency mapping in the full-duplex time-frequency resource for the DMRS transmission, are a same time-frequency mapping.

In some aspects, a method of wireless communication, performed by a wireless communication device, may include receiving, from a BS and based at least in part on a collision between a data transmission and a DMRS transmission in a full-duplex time-frequency resource, an indication of a time-frequency mapping for a ZP-DMRS in the full-duplex time-frequency resource, wherein the time-frequency mapping for the ZP-DMRS, and a time-frequency mapping in the full-duplex time-frequency resource for the DMRS transmission, are a same time-frequency mapping; and rate matching the data transmission based at least in part on the time-frequency mapping for the ZP-DMRS, or receiving, from the BS, the data transmission based at least in part on the data transmission being rate matched based at least in part on the time-frequency mapping for the ZP-DMRS.

In some aspects, a BS for wireless communication may include memory and one or more processors operatively coupled to the memory. The memory and the one or more processors may be configured to identify a collision between a data transmission and a DMRS transmission in a full-duplex time-frequency resource; and transmit, to a wireless communication device, an indication of a time-frequency mapping for a ZP-DMRS in the full-duplex time-frequency resource, wherein the time-frequency mapping for the ZP-DMRS, and a time-frequency mapping in the full-duplex time-frequency resource for the DMRS transmission, are a same time-frequency mapping.

In some aspects, a wireless communication device for wireless communication may include memory and one or more processors operatively coupled to the memory. The memory and the one or more processors may be configured to receive, from a BS and based at least in part on a collision between a data transmission and a DMRS transmission in a full-duplex time-frequency resource, an indication of a time-frequency mapping for a ZP-DMRS in the full-duplex time-frequency resource, wherein the time-frequency mapping for the ZP-DMRS, and a time-frequency mapping in the full-duplex time-frequency resource for the DMRS transmission, are a same time-frequency mapping; and rate matching the data transmission based at least in part on the time-frequency mapping for the ZP-DMRS, or receive, from the BS, the data transmission based at least in part on the data transmission being rate matched based at least in part on the time-frequency mapping for the ZP-DMRS.

In some aspects, a non-transitory computer-readable medium may store one or more instructions for wireless communication. The one or more instructions, when executed by one or more processors of a wireless communication device, may cause the one or more processors to: identify a collision between a data transmission and a DMRS transmission in a full-duplex time-frequency resource; and transmit, to a wireless communication device, an indication of a time-frequency mapping for a ZP-DMRS in the full-duplex time-frequency resource, wherein the time-frequency mapping for the ZP-DMRS, and a time-frequency mapping in the full-duplex time-frequency resource for the DMRS transmission, are a same time-frequency mapping.

In some aspects, a non-transitory computer-readable medium may store one or more instructions for wireless communication. The one or more instructions, when executed by one or more processors of a wireless communication device, may cause the one or more processors to: receive, from a BS and based at least in part on a collision between a data transmission and a DMRS transmission in a full-duplex time-frequency resource, an indication of a time-frequency mapping for a ZP-DMRS in the full-duplex time-frequency resource, wherein the time-frequency mapping for the ZP-DMRS, and a time-frequency mapping in the full-duplex time-frequency resource for the DMRS transmission, are a same time-frequency mapping; and rate matching the data transmission based at least in part on the time-frequency mapping for the ZP-DMRS, or receive, from the BS, the data transmission based at least in part on the data transmission being rate matched based at least in part on the time-frequency mapping for the ZP-DMRS.

In some aspects, an apparatus for wireless communication may include means for identifying a collision between a data transmission and a DMRS transmission in a full-duplex time-frequency resource; and means for transmitting, to a wireless communication device, an indication of a time-frequency mapping for a ZP-DMRS in the full-duplex time-frequency resource, wherein the time-frequency mapping for the ZP-DMRS, and a time-frequency mapping in the full-duplex time-frequency resource for the DMRS transmission, are a same time-frequency mapping.

In some aspects, an apparatus for wireless communication may include means for receiving, from a BS and based at least in part on a collision between a data transmission and a DMRS transmission in a full-duplex time-frequency resource, an indication of a time-frequency mapping for a ZP-DMRS in the full-duplex time-frequency resource, wherein the time-frequency mapping for the ZP-DMRS, and a time-frequency mapping in the full-duplex time-frequency resource for the DMRS transmission, are a same time-frequency mapping; and means for rate matching the data transmission based at least in part on the time-frequency mapping for the ZP-DMRS or means for receiving, from the BS, the data transmission based at least in part on the data transmission being rate matched based at least in part on the time-frequency mapping for the ZP-DMRS.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

FIG. 9 is a diagram illustrating an example process performed, for example, by a wireless communication device, in accordance with various aspects of the present disclosure.

DETAILED DESCRIPTION

Figure 1:
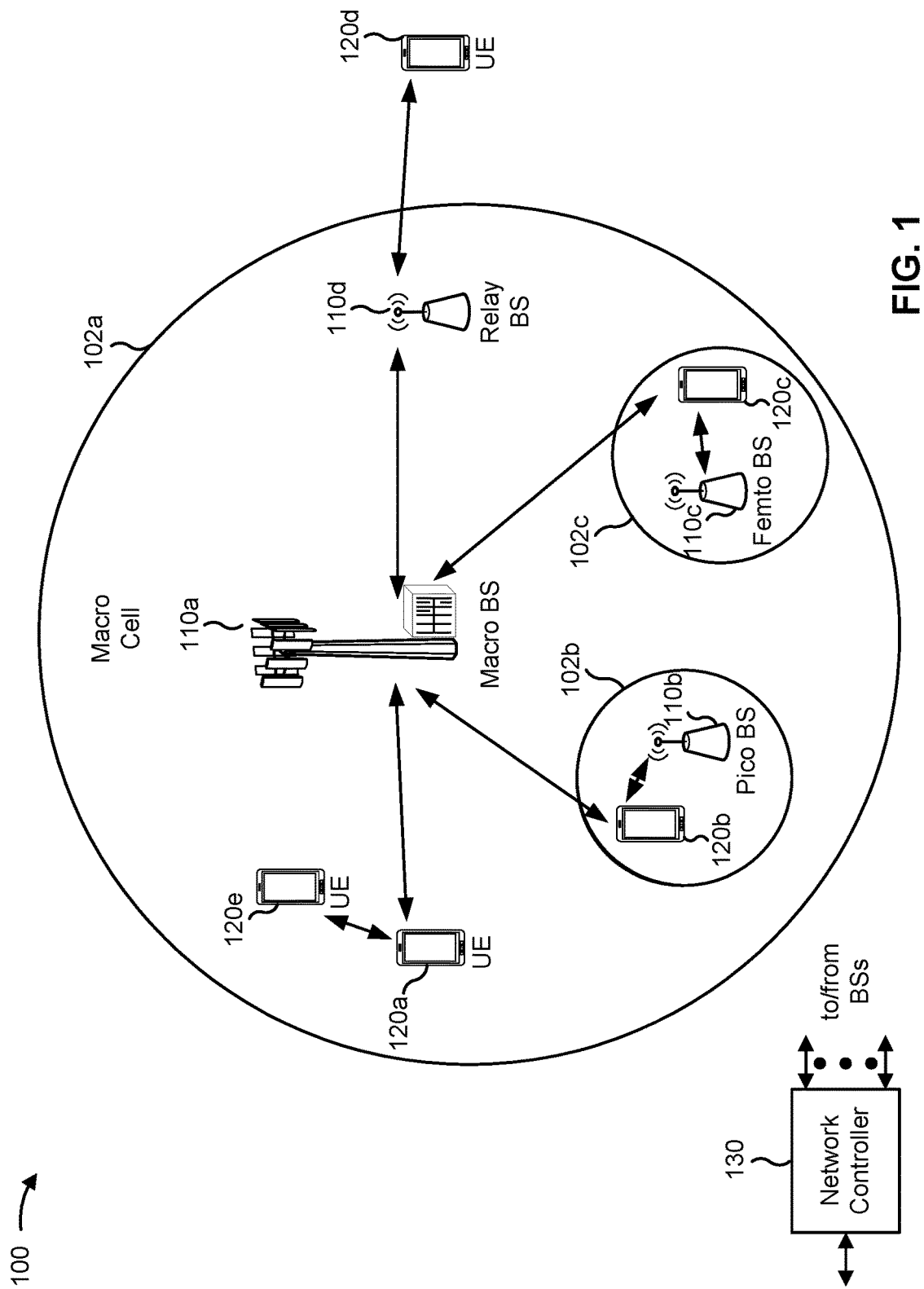
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) (e.g., using full-duplex communication, non-full-duplex communication, and/or the like) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used. In some aspects, a BS may configure a UE with one or more transmit power configurations for communicating with the BS using full-duplex communication, non-full-duplex communication, and/or the like, as described herein.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. Additionally, or alternatively, a BS may support access to an unlicensed RF band (e.g., a Wi-Fi band and/or the like). A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network. In other scenarios, BSs may be implemented in a software defined network (SDN) manner or via network function virtualization (NFV) manner.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like. These components may be integrated in a variety of combinations and/or may be stand-alone, distributed components considering design constraints and/or operational preferences.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. A UE performing scheduling operations can include or perform base-station-like functions in these deployment scenarios.

As indicated above, FIG. 1 is provided merely as an example. Other examples may differ from what is described with regard to FIG. 1.

Figure 2:
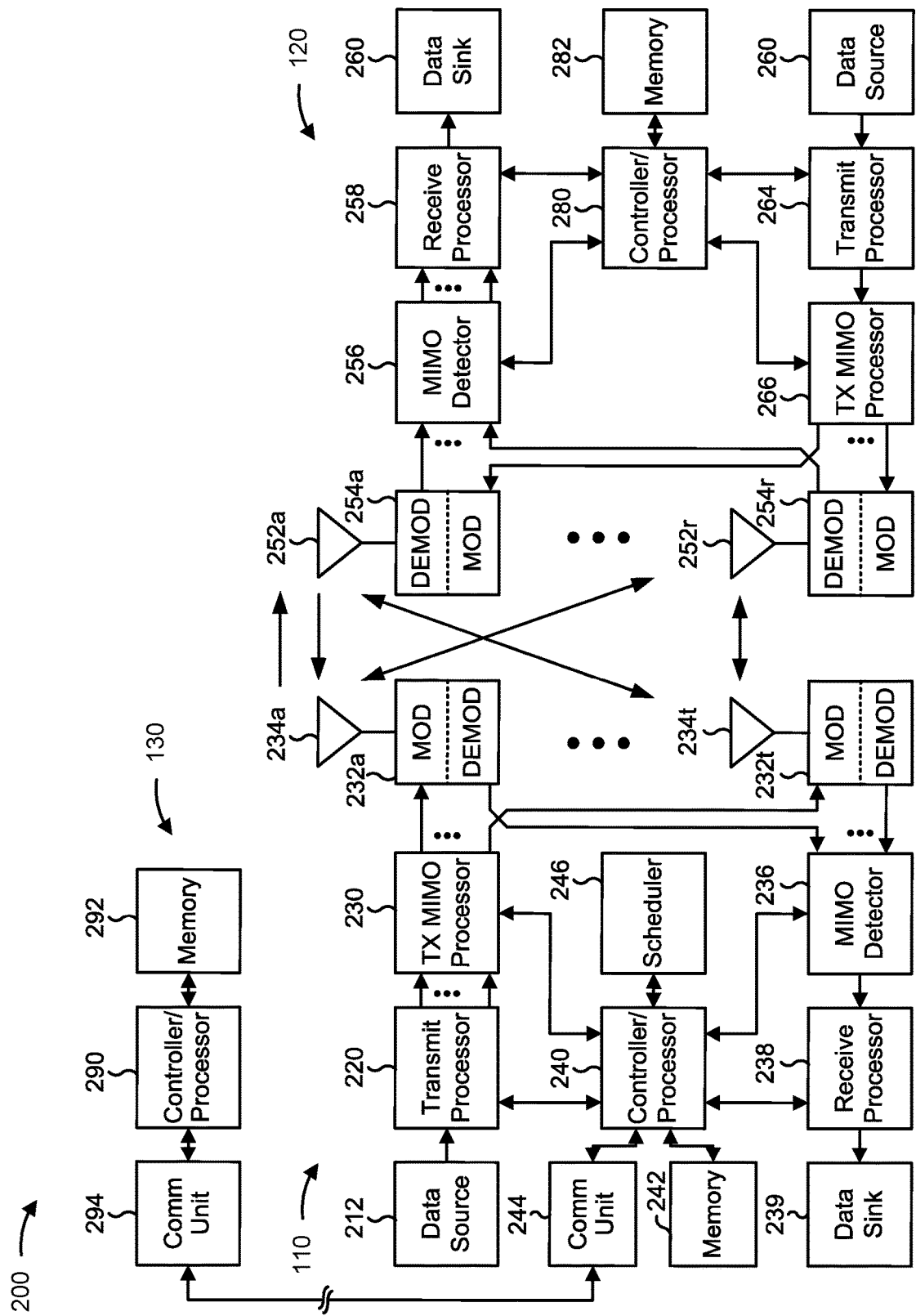
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1. The T and R antennas may be configured with multiple antenna elements formed in an array for MIMO or massive MIMO deployments that can occur in millimeter wave (mmWave or mmW) communication systems.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive downlink RF signals. The downlink RF signals may be received from and/or may be transmitted by one or more base stations 110. The signals can be provided to demodulators (DEMODs) 254a through 254r, respectively. Each demodulator 254 may condition (e.g., filter, amplify, down-convert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

For uplink communications, a UE 120 may transmit control information and/or data to another device, such as one or more base stations 110. For example, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with demodulation reference signal (DMRS) for full-duplex communication, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, a wireless communication device (e.g., a UE 120, a BS 110, and/or the like) may include a variety of means or components for implementing communication functions. For example, the variety of means may include means for receiving, from a BS 110 and based at least in part on a collision between a data transmission and a DMRS transmission in a full-duplex time-frequency resource, an indication of a time-frequency mapping for a zero-power DMRS ZP-DMRS in the full-duplex time-frequency resource, wherein the time-frequency mapping for the ZP-DMRS, and a time-frequency mapping in the full-duplex time-frequency resource for the DMRS transmission, are a same time-frequency mapping; means for rate matching the data transmission based at least in part on the time-frequency mapping for the ZP-DMRS; means for receiving, from the BS, the data transmission based at least in part on the data transmission being rate matched based at least in part on the time-frequency mapping for the ZP-DMRS; and/or the like.

In some aspects, the base station 110 may include a variety of means or components for implementing communication functions. For example, the variety of means may include means for identifying a collision between a data transmission and a DMRS transmission in a full-duplex time-frequency resource; means for transmitting, to a wireless communication device, an indication of a time-frequency mapping for a ZP-DMRS in the full-duplex time-frequency resource, wherein the time-frequency mapping for the ZP-DMRS, and a time-frequency mapping in the full-duplex time-frequency resource for the DMRS transmission, are a same time-frequency mapping; and/or the like.

In some aspects, the UE 120 may include a variety of structural components for carrying out functions of the various means. For example, structural components that carry out functions of such means may include one or more components of UE 120 described in connection with FIG. 2, such as antenna 252, DEMOD 254, MOD 254, MIMO detector 256, receive processor 258, transmit processor 264, TX MIMO processor 266, controller/processor 280, and/or the like.

In some aspects, the base station 110 may include a variety of structural components for carrying out functions of the various means. For example, structural components that carry out functions of such means may include one or more components of base station 110 described in connection with FIG. 2, such as transmit processor 220, TX MIMO processor 230, DEMOD 232, MOD 232, antenna 234, MIMO detector 236, receive processor 238, controller/processor 240, and/or the like.

As indicated above, FIG. 2 is provided merely as an example. Other examples may differ from what is described with regard to FIG. 2.

Figure 3A:
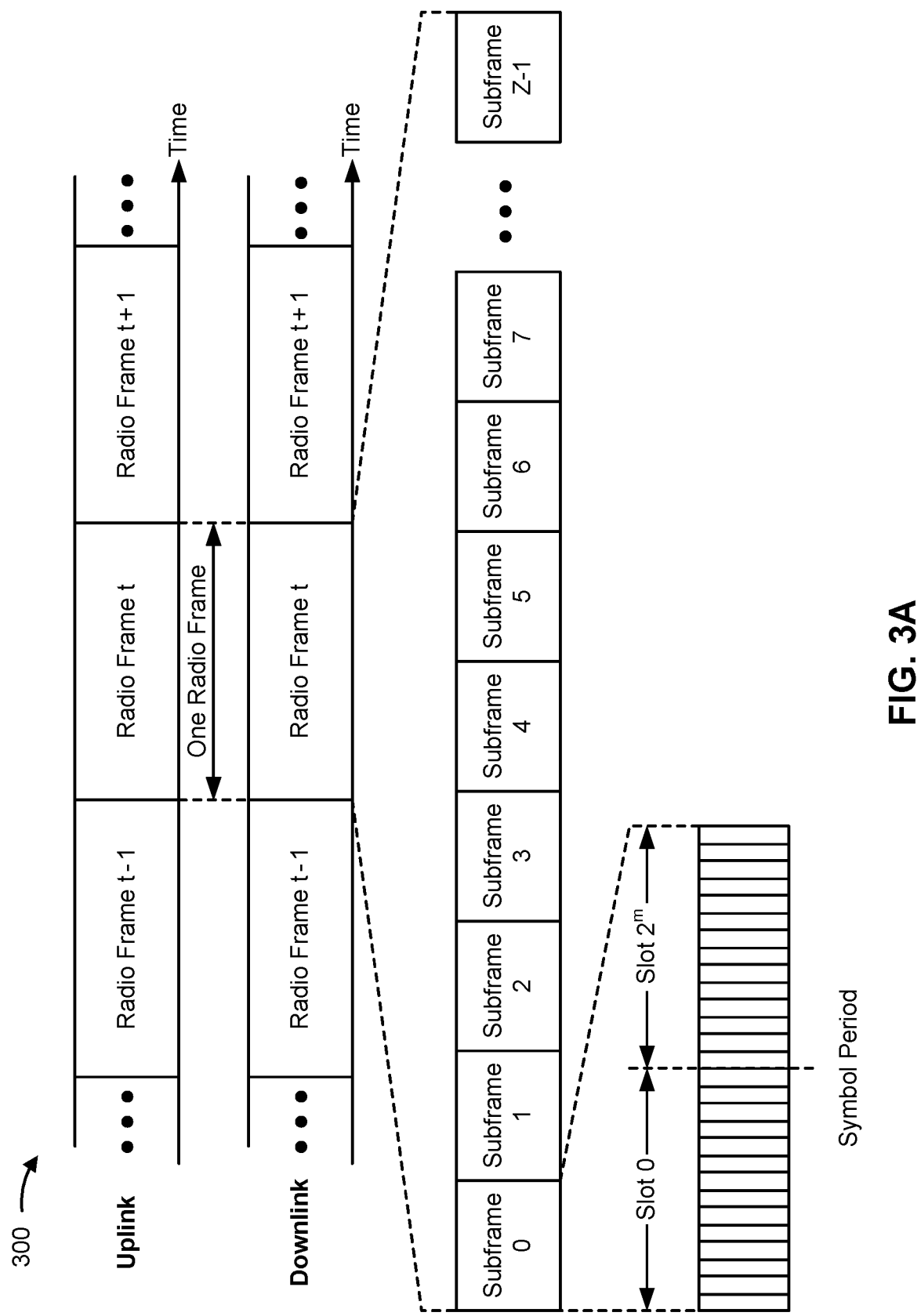
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z ($Z \geq 1$) subframes (e.g., with indices of 0 through Z-1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
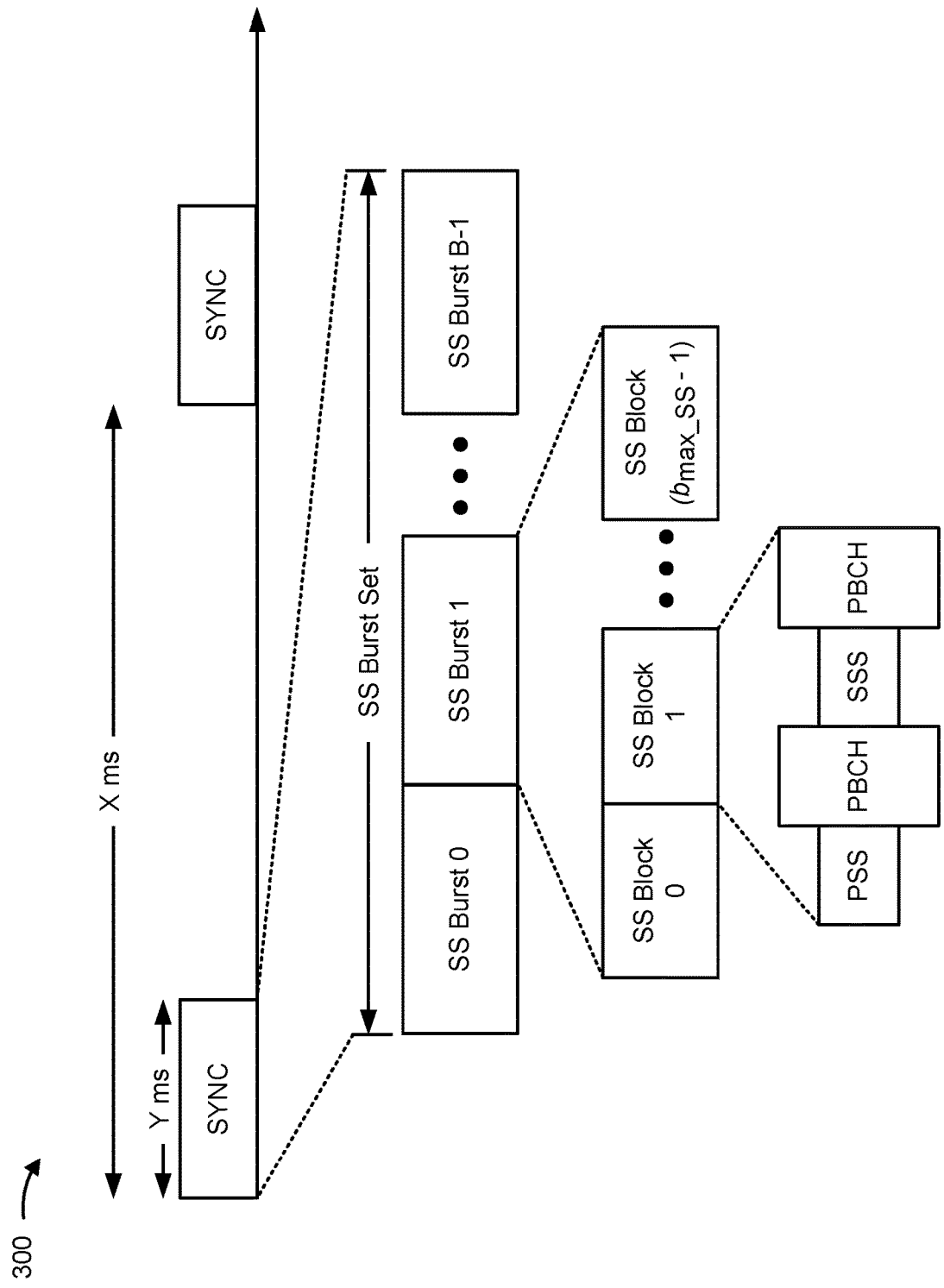
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
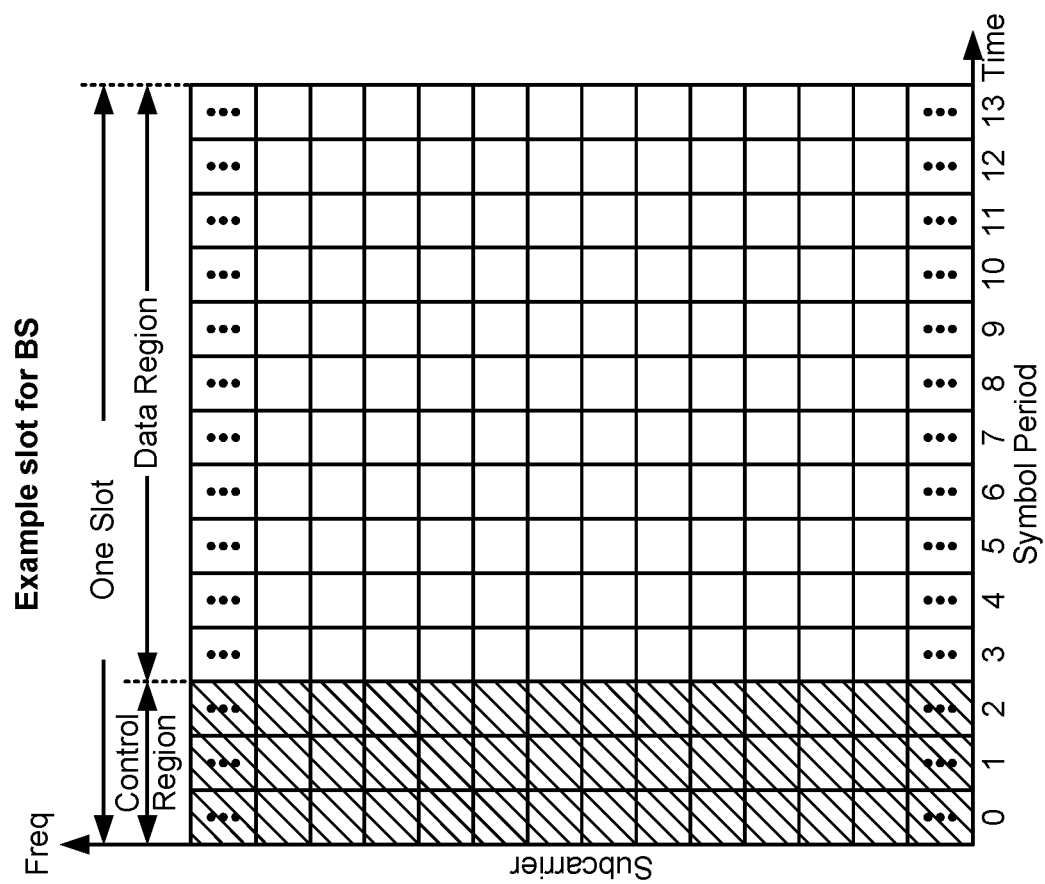
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

5G wireless networks are designed to provide a high data rate and to support a wide scope of application scenarios. Wireless full-duplex communication is a technique intended to increase link capacity in 5G wireless networks (and/or other types of wireless networks) and/or to reduce latency for time-critical services. Full-duplex communication enables wireless communication devices to transmit and receive simultaneously in the same frequency-domain resource and time-domain resource. This contrasts with conventional half-duplex communication (and/or other types of non-full-duplex communication) where transmission and reception differ in time and/or frequency.

Figure 5A:
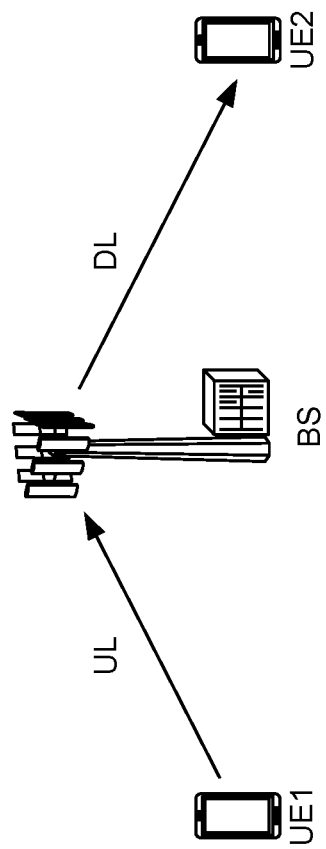
FIGS. 5A-5C are diagrams illustrating examples of full-duplex communication in a wireless network, in accordance with various aspects of the present disclosure.
Figure 5B:
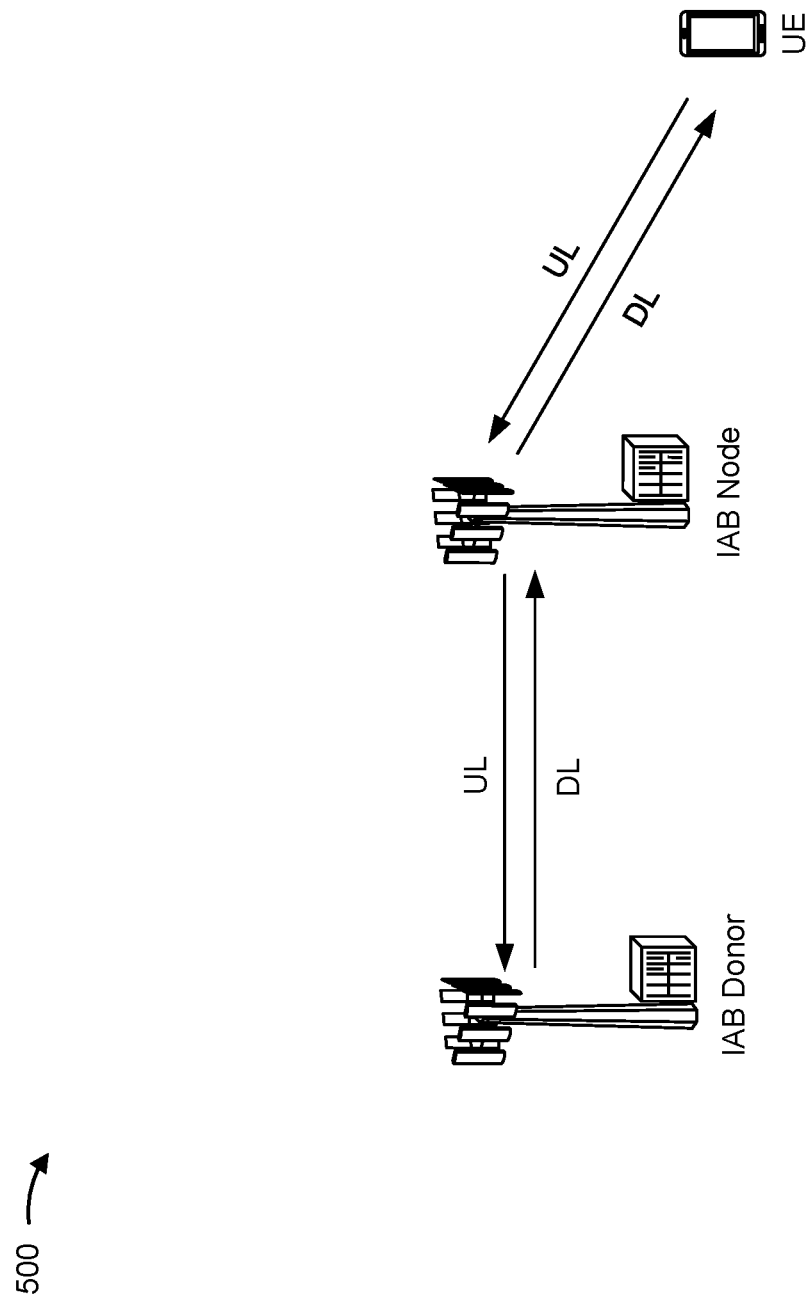
Figure 5C:
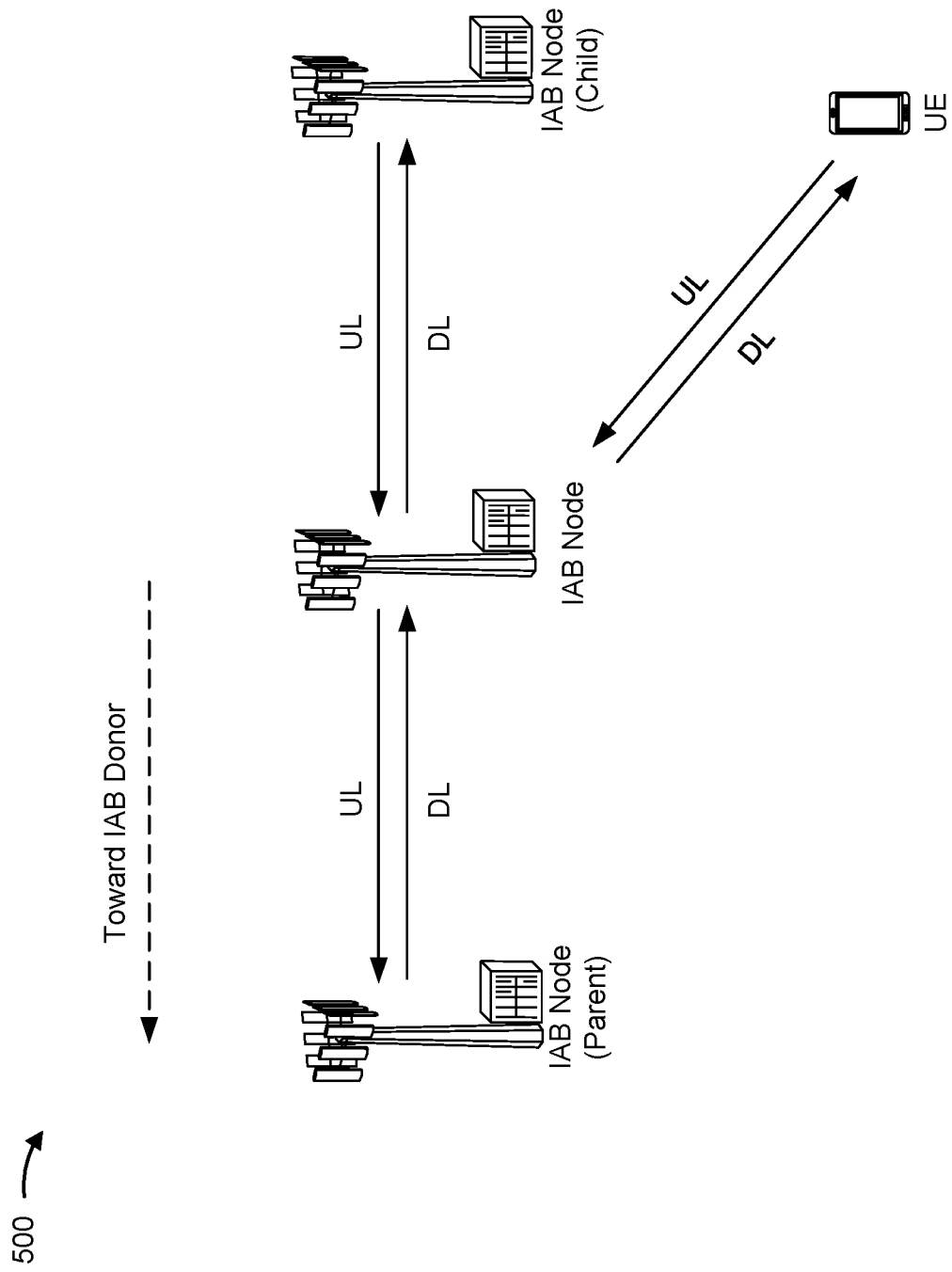

FIGS. 5A-5C are diagrams illustrating examples 500 of full-duplex communication in a wireless network, such as wireless network 100. For example, FIGS. 5A-5C show various example full-duplex deployment scenarios in which some aspects described herein may be implemented.

FIG. 5A shows a first example full-duplex deployment scenario in which some aspects described herein may be implemented. In this first example scenario, uplink (UL) and downlink (DL) communication between a BS (e.g., BS 110) and a plurality of UEs (e.g., UEs 120, referred to in the first example as UE1 and UE2) may include full-duplex communications. For example, UE1 may transmit UL communications to the BS, and the BS may transmit DL communications to UE2 in the same time-frequency resource.

FIG. 5B shows a second example deployment scenario in which some aspects described herein may be implemented. The second example scenario may include a full-duplex integrated access and backhaul (IAB) deployment. An IAB deployment may include an IAB donor (which may include a BS that is connected to a wireline backhaul in the wireless network) and one or more IAB nodes (which may include one or more BSs that are communicatively connected to the IAB donor via a backhaul link, to another IAB node via a backhaul link or sidelink, or a combination thereof). A UE may communicate with an IAB donor or IAB node via an access link.

In this second example scenario, an IAB node (e.g., a first BS 110) may communicate with an IAB donor (e.g., a second BS 110) and a UE (e.g., UE 120). The IAB node may receive downlink communications from the IAB donor and may transmit uplink communications to the IAB donor. Moreover, the IAB node may transmit downlink communications to the UE and may receive uplink communications from the UE. In some aspects, full-duplex communication in the IAB deployment may include uplink communication and downlink communication in the same time-frequency resource between the IAB donor and the IAB node. In some aspects, full-duplex communication in the IAB deployment may include uplink communication and downlink communication in the same time-frequency resource between the UE and the IAB node. In some aspects, full-duplex communication in the IAB deployment may include downlink communication between the IAB donor and the IAB node, and downlink communication between the UE and the IAB node, in the same time-frequency resource. In some aspects, full-duplex communication in the IAB deployment may include uplink communication between the IAB donor and the IAB node, and uplink communication between the UE and the IAB node, in the same time-frequency resource.

FIG. 5C shows a third example deployment scenario in which some aspects described herein may be implemented. The third example scenario may include a full-duplex IAB deployment. In this third example scenario, a parent IAB node (e.g., a first BS 110) may communicate with an IAB node (e.g., a second BS 110), and the IAB node may communicate with a UE (e.g., UE 120) and a child IAB node. The parent IAB node may be upstream from an IAB donor relative to the IAB node, and the child IAB node may be downstream from the IAB donor relative to the IAB node.

In some aspects, full-duplex communication in the IAB deployment may include uplink communication and downlink communication in the same time-frequency resource between the parent IAB node and the IAB node. In some aspects, full-duplex communication in the IAB deployment may include uplink communication and downlink communication in the same time-frequency resource between the IAB node and the child JAB node. In some aspects, full-duplex communication in the TAB deployment may include uplink communication and downlink communication in the same time-frequency resource between the UE and the IAB node.

In some aspects, full-duplex communication in the IAB deployment may include downlink communication between the parent IAB node and the IAB node, and downlink communication between the UE and the IAB node, in the same time-frequency resource. In some aspects, full-duplex communication in the IAB deployment may include uplink communication between the parent IAB node and the IAB node, and uplink communication between the UE and the IAB node, in the same time-frequency resource.

In some aspects, full-duplex communication in the IAB deployment may include downlink communication between the parent IAB node and the IAB node, and downlink communication between the IAB node and the child IAB node, in the same time-frequency resource. In some aspects, full-duplex communication in the IAB deployment may include uplink communication between the parent IAB node and the IAB node, and uplink communication between IAB node and the child IAB node, in the same time-frequency resource.

In some aspects, full-duplex communication in the IAB deployment may include uplink communication between the UE and the IAB node, and downlink communication between the IAB node and the child IAB node, in the same time-frequency resource. In some aspects, full-duplex communication in the IAB deployment may include downlink communication between the UE and the IAB node, and uplink communication between IAB node and the child IAB node, in the same time-frequency resource.

As indicated above, FIGS. 5A-5C are provided as examples. Other examples may differ from what is described with respect to FIGS. 5A-5C.

Devices included in a full-duplex deployment in a wireless network may transmit and/or receive various types of full-duplex transmissions, such as data transmissions, control transmissions, reference signal transmissions, and/or the like. In some cases, a device may be scheduled to transmit a data transmission in the same time-frequency resource as a DMRS transmission that is scheduled to be transmitted by another device to the device. A DMRS may include a reference signal that is transmitted to facilitate a receiver of the DMRS in demodulating and/or decoding other communications that are received at the receiver. In some cases, interference with a DMRS transmission may occur where the DMRS transmission and a data transmission are transmitted in full duplex (e.g., where the DMRS transmission and the data transmission occur in the same full duplex time-frequency resource).

For example, in a scenario where a first wireless communication device (e.g., a UE, another BS, an IAB node, an IAB donor, and/or the like) transmits an uplink DMRS transmission to a BS (or an IAB node), and the BS (or the IAB node) transmits a downlink data transmission to a second wireless communication device (e.g., a UE, another BS, an IAB node, an IAB donor, and/or the like), the full-duplex transmission of the uplink DMRS transmission and the downlink data transmission may cause self-interference at the BS. The transmit power of the downlink data transmission may, in turn, cause interference with the reception of the uplink DMRS transmission at the BS, which may be referred to as self-interference. This self-interference at the BS may cause a decrease in DMRS-based channel estimation performance for the DMRS received at the BS. Similar self-interference may occur for a full-duplex capable UE that communicates with one or more BSs or IAB nodes in full duplex.

As another example, wireless communication devices (e.g., UEs, IAB nodes, antennas of a same BS, and/or the like) that are located proximate to each other may experience inter-device interference (e.g., inter-UE interference, inter-IAB node interference, inter-antenna interference, and/ or the like), where a first wireless communication device transmits an uplink data transmission to a BS, and a second wireless communication device receives a downlink DMRS transmission from the BS. Due to the proximity of the first and second wireless communication devices, the uplink data transmission may cause the second wireless communication device to boost interference power, which may cause a decrease in DMRS-based channel estimation performance for the DMRS received at the second wireless communication device.

Some aspects described herein provide techniques and apparatuses for DMRS for full-duplex communication. In some aspects, a wireless communication device (e.g., a UE, a BS, an IAB node, and/or the like) may identify a collision between a data transmission and a DMRS transmission in a full-duplex time-frequency resource. The wireless communication device may configure a ZP-DMRS based at least in part on identifying the collision. The wireless communication device may configure the ZP-DMRS such that a time-frequency mapping for the ZP-DMRS is the same as a time-frequency mapping for the DMRS transmission and the data transmission. In other words, in the symbols and subcarriers in which the data transmission and the DMRS transmission collide, the wireless communication device configures the ZP-DMRS to replace the data transmission in the symbols and subcarriers.

In this way, the symbols and subcarriers occupied by the ZP-DMRS are precluded when rate matching and/or rate dematching is performed for the data transmission, which reduces or prevents interference boosting caused by the simultaneous transmission and reception of the data transmission and the DMRS transmission, respectively. This reduces self-interference and/or inter-device interference, which improves DMRS-based channel estimation performance based at least in part on the DMRS transmission, improves signal reception and decoding performance, increases data throughput, and/or the like.

Figure 6A:
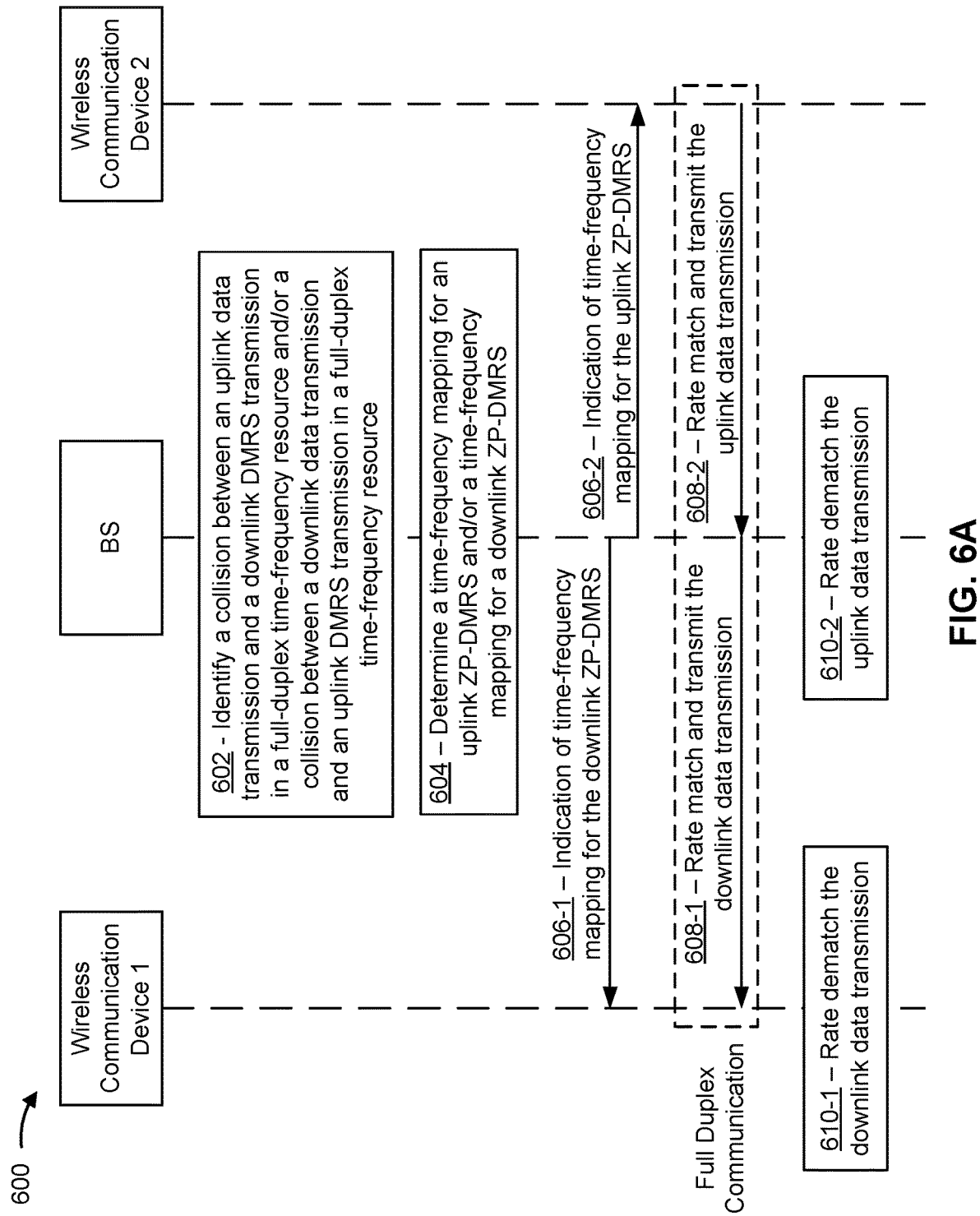
FIGS. 6A, 6B and 7 are diagrams illustrating examples of demodulation reference signal (DMRS) for full-duplex communication, in accordance with various aspects of the present disclosure.
Figure 6B:
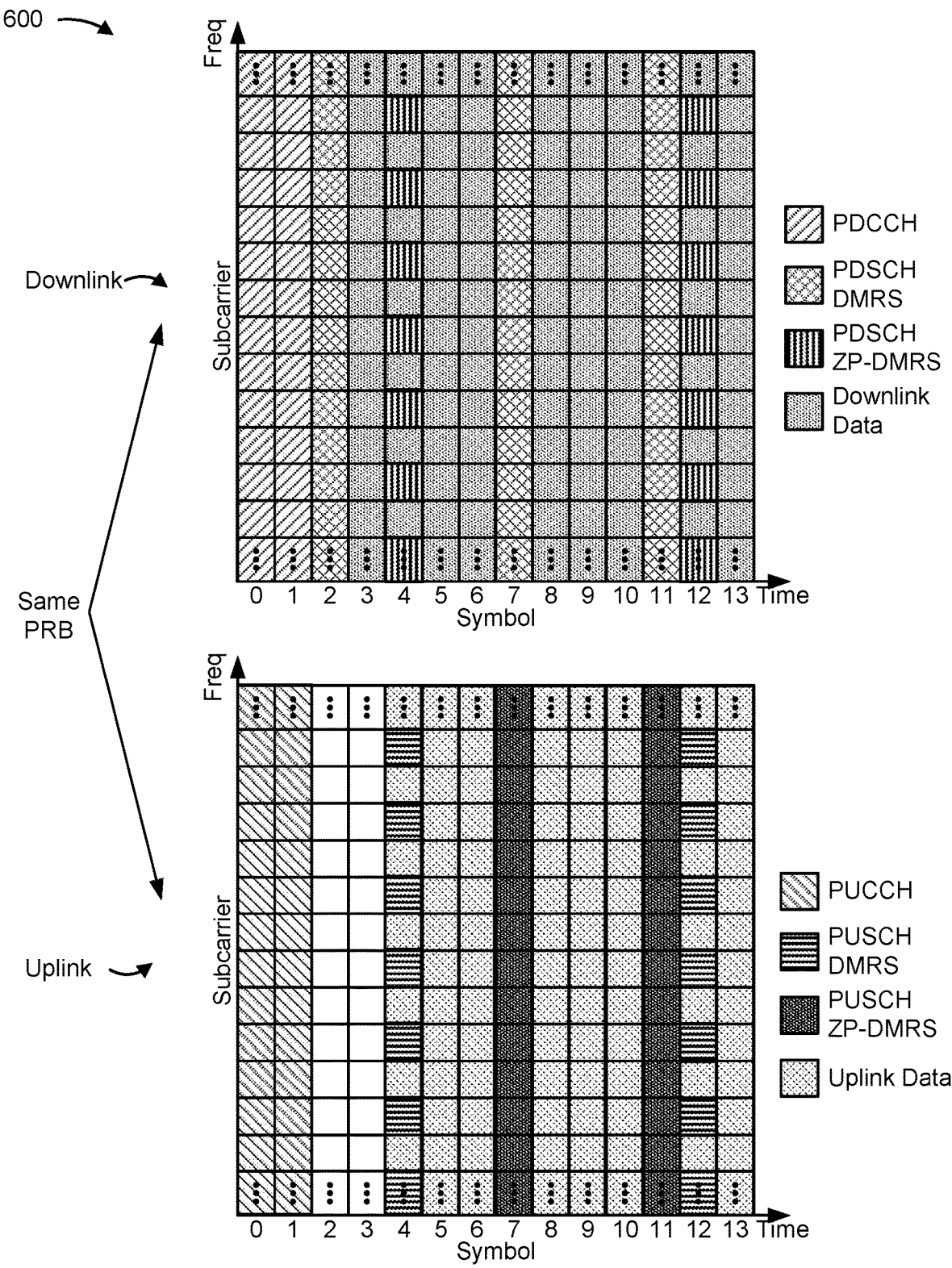

FIGS. 6A and 6B are diagrams illustrating examples 600 of DMRS for full-duplex communication, in accordance with various aspects of the present disclosure. As shown in FIG. 6A, examples 600 may include communication between a BS (e.g., BS 110) and a plurality of wireless communication devices (e.g., UE 120, BS 110, and/or the like), such as wireless communication device 1 and wireless communication device 2.

In some aspects, the BS and the plurality of wireless communication devices may be included in a full-duplex communication scenarios. For example, wireless communication device 1 and wireless communication device 2 may each be a UE that communicates with the BS (e.g., as illustrated in FIG. 5A). As another example, the BS may be an IAB node, wireless communication device 1 may be an IAB donor or another IAB node (e.g., parent IAB node or child IAB node) implemented by another BS, and wireless communication device 2 may be a UE (e.g., as illustrated in FIG. 5B or FIG. 5C). As another example, the BS may be an IAB node, wireless communication device 1 may be a UE, and wireless communication device 2 may be an IAB donor or another IAB node (e.g., parent IAB node or child IAB node) implemented by another BS (e.g., as illustrated in FIG. 5B or FIG. 5C). As another example, the BS may be an IAB node, wireless communication device 1 may be an IAB donor or another IAB node (e.g., parent IAB node or child IAB node) implemented by another BS (e.g., as illustrated in FIG. 5C), and wireless communication device 2 may be an IAB donor or another IAB node (e.g., parent IAB node or child IAB node) implemented by another BS (e.g., as illustrated in FIG. 5C).

In some aspects, the BS and the plurality of wireless communication devices may communicate using full-duplex and non-full-duplex communication, such as half duplex and/or other types of non-full-duplex communication. In some aspects, the BS and the plurality of wireless communication devices may transmit and/or receive data transmissions (e.g., downlink or PDSCH data transmissions and/or uplink or physical uplink shared channel (PUSCH) data transmissions) and/or control communications (e.g., downlink or PDCCH control transmissions and/or uplink or PUCCH control transmissions). In some aspects, the BS and the plurality of wireless communication devices may transmit and/or receive one or more types of reference signals, such as a CSI-RS, a DMRS, and/or the like.

In some aspects, the BS may function as a scheduling entity for the plurality of wireless communication devices. In this case, the BS may schedule the full-duplex and non-full-duplex communication between the BS and the plurality of wireless communication devices.

As shown in FIG. 6A, and by reference number 602, as part of scheduling full-duplex communication between the BS and the plurality of wireless communication devices, the BS may identify one or more collisions between data transmissions and DMRS transmissions. A collision between a data transmission and a DMRS transmission may occur where the data transmission and the DMRS transmission are scheduled to be transmitted on opposing links (e.g., uplink and downlink) and in the same time-frequency resource (e.g., in the same resource elements or symbol/subcarrier combinations in the time-frequency resource). For example, the BS may identify a collision between an uplink (or PUSCH) data transmission and a downlink (or PDSCH) DMRS transmission in a full-duplex time-frequency resource and/or may identify a collision between a downlink (or PDSCH) data transmission and an uplink (or PUSCH) DMRS transmission in a full-duplex time-frequency resource (e.g., the same full-duplex time-frequency resource as the collision between the uplink data transmission and the downlink DMRS transmission and/or another full-duplex time-frequency resource).

As further shown in FIG. 6A, and by reference number 604, the BS may determine a time-frequency mapping for an uplink (or PUSCH) ZP-DMRS (e.g., based at least in part on detecting a collision between an uplink data transmission and a downlink DMRS transmission) and/or a time-frequency mapping for a downlink (or PDSCH) ZP-DMRS (e.g., based at least in part on detecting a collision between a downlink data transmission and an uplink DMRS transmission). The time-frequency mapping for the uplink ZP-DMRS may be the same as the time-frequency mapping for the downlink DMRS, and time-frequency mapping for the downlink ZP-DMRS may be the same as the time-frequency mapping for the uplink DMRS. The time-frequency mapping for the uplink ZP-DMRS may indicate or specify the resource elements or symbol/subcarrier combinations to which the uplink ZP-DMRS is mapped. Similarly, the time-frequency mapping for the downlink ZP-DMRS may indicate or specify the resource elements or symbol/subcarrier combinations to which the downlink ZP-DMRS is mapped.

As indicated above, a collision between a data transmission and a DMRS transmission may cause interference with the DMRS transmission and degraded channel estimation performance based at least in part on the DMRS transmission. Accordingly, in the resource elements or symbol/subcarrier combinations in which the uplink data transmission collides with the downlink DMRS transmission, the BS may replace the uplink data transmission with the uplink ZP-DMRS. Moreover, in the resource elements or symbol/subcarrier combinations in which the downlink data transmission collides with the uplink DMRS transmission, the BS may replace the downlink data transmission with the downlink ZP-DMRS.

A ZP-DMRS may be a "zero power" DMRS in that the ZP-DMRS is configured with zero transmit power such that a transmitter of the ZP-DMRS refrains from transmitting in the resource elements or symbol/subcarrier combinations to which the ZP-DMRS is mapped. Thus, where a ZP-DMRS is mapped to the same resource elements or symbol/subcarrier combinations in a full-duplex time-frequency resource as a DMRS transmission, such that the ZP-DMRS replaces a data transmission that would have collided with the DMRS transmission, the "zero power" of the ZP-DMRS reduces or prevents interference with the DMRS transmission that would have otherwise been caused by the data transmission.

In some aspects, the BS may determine the time-frequency mapping for the uplink ZP-DMRS based at least in part on detecting the collision between the uplink data transmission and the downlink DMRS transmission, and/or may determine the time-frequency mapping for the downlink ZP-DMRS based at least in part on detecting the collision between the downlink data transmission and the uplink DMRS transmission. In some aspects, the BS may determine the time-frequency mapping for the uplink ZP-DMRS based at least in part on determining that the collision between the uplink data transmission and the downlink DMRS transmission is to result in interference that satisfies an interference threshold and/or may determine the time-frequency mapping for the downlink ZP-DMRS based at least in part on determining that the collision between the downlink data transmission and the uplink DMRS transmission is to result in interference that satisfies the same interference threshold or a different interference threshold. The interference threshold(s) may include a self-interference threshold, an inter-device interference threshold, a signal-to-interference-plus-noise ratio (SINR) threshold, and/or another type of interference threshold.

As further shown in FIG. 6A, and by reference number 606, the BS may transmit an indication of the time-frequency mapping for the downlink ZP-DMRS to wireless communication device 1 (reference number 606-1) and/or may transmit an indication of the time-frequency mapping for the uplink ZP-DMRS to wireless communication device 2 (reference number 606-2). In this way, wireless communication device 1 may rate dematch the downlink data transmission based at least in part on the indication of the time-frequency mapping for the downlink ZP-DMRS, and/or wireless communication device 2 may rate match the uplink data transmission based at least in part on the indication of the time-frequency mapping for the uplink ZP-DMRS.

In some aspects, the BS may transmit an indication of a time-frequency mapping for a ZP-DMRS (e.g., for the downlink ZP-DMRS and/or the uplink ZP-DMRS) in one or more signaling communications, such as one or more radio resource control (RRC) communications, one or more medium access control (MAC) control element (MAC-CE) communications, one or more downlink control information (DCI) communications, and/or the like.

In some aspects, an indication of a time-frequency mapping for a ZP-DMRS may identify the resource elements or symbol/subcarrier combinations to which the ZP-DMRS is mapped. For example, an indication of a time-frequency mapping for a ZP-DMRS may identify the symbol indexes associated with the resource elements or symbol/subcarrier combinations to which the ZP-DMRS is mapped, may identify the resource block indexes associated with the resource elements or symbol/subcarrier combinations to which the ZP-DMRS is mapped, may identify the resource element indexes associated with the resource elements or symbol/subcarrier combinations to which the ZP-DMRS is mapped, and/or the like.

In some aspects, an indication of a time-frequency mapping for a ZP-DMRS may include a bitmap that indicates respective locations of the resource elements or symbol/subcarrier combinations to which the ZP-DMRS is mapped. The length of the bitmap may be based at least in part on a quantity of symbols included in the physical channel of the data transmission associated with the ZP-DMRS, may be based at least in part on a quantity of physical resource blocks included in the physical channel of the data transmission associated with the ZP-DMRS, may be based at least in part on a quantity of resource elements included in the physical channel of the data transmission associated with the ZP-DMRS or a quantity of resource elements included in one physical resource block, and/or the like.

In some aspects, an indication of a time-frequency mapping for a ZP-DMRS may be included in a DMRS configuration whose format is the same as the DMRS configuration for a DMRS transmission that collides with a data transmission associated with the ZP-DMRS. For example, an indication of the time-frequency mapping for the uplink ZP-DMRS may be included in a DMRS configuration for the downlink DMRS transmission that collides with the uplink data transmission. As another example, an indication of the time-frequency mapping for the downlink ZP-DMRS may be included in a DMRS configuration whose format is the same as the DMRS configuration for the uplink DMRS transmission that collides with the downlink data transmission. In this case, since the time-frequency mapping for the ZP-DMRS is the same time-frequency mapping for the DMRS transmission, the BS may transmit or forward the DMRS configuration for the DMRS transmission as an indication of the time-frequency mapping for the ZP-DMRS.

Accordingly, the BS may transmit or forward, to wireless communication device 1, an indication of the DMRS configuration for the uplink DMRS transmission, which may serve as the indication of the time-frequency mapping for the downlink ZP-DMRS. Similarly, the BS may transmit or forward, to wireless communication device 2, an indication of the DMRS configuration for the downlink DMRS transmission, which may serve as the indication of the time-frequency mapping for the uplink ZP-DMRS.

In some aspects, the BS may transmit an indication of a time-frequency mapping for a ZP-DMRS in a plurality of signaling communications. For example, the BS may transmit an indication of a plurality of candidate time-frequency mappings for a ZP-DMRS in a static signaling communication (e.g., an RRC communication) or a semi-static signaling communication (e.g., a MAC-CE communication), and may transmit a dynamic signaling communication (e.g., a DCI communication) that identifies or selects the time-frequency mapping for the ZP-DMRS from among the plurality of candidate time-frequency mappings by indexing into the plurality of candidate time-frequency mappings.

As another example, the BS may transmit an indication of a plurality of candidate DMRS configurations for a ZP-DMRS in a static signaling communication (e.g., an RRC communication) or a semi-static signaling communication (e.g., a MAC-CE communication), and may transmit a dynamic signaling communication (e.g., a DCI communication) that identifies or selects the DMRS configuration for the ZP-DMRS from among the plurality of candidate DMRS configurations by indexing into the plurality of candidate DMRS configurations.

As another example, the BS may transmit an indication of a first subset of parameters for a DMRS configuration for a ZP-DMRS in a static signaling communication (e.g., an RRC communication) or a semi-static signaling communication (e.g., a MAC-CE communication), and may transmit a dynamic signaling communication (e.g., a DCI communication) that identifies a second subset of parameters for a DMRS configuration for a ZP-DMRS.

As further shown in FIG. 6A, and by reference number 608, the BS and the plurality of wireless communication devices may perform full-duplex communication based at least in part on the time-frequency mapping for the downlink ZP-DMRS and/or the time-frequency mapping for the uplink ZP-DMRS. For example, the BS may rate match and transmit the downlink data transmission based at least in part on the time-frequency mapping for the downlink ZP-DMRS (reference number 608-1). As another example, wireless communication device 2 may receive the indication of the time-frequency mapping for the uplink ZP-DMRS, and may rate match and transmit the uplink data transmission based at least in part on the time-frequency mapping for the uplink ZP-DMRS (reference number 608-2).

In some aspects, the BS and/or wireless communication device 2 may rate match a data transmission based at least in part on a time-frequency mapping for a ZP-DMRS by precluding, from the data transmission, one or more resource elements or symbol/subcarrier combinations included in the full-duplex time-frequency resource and indicated by the time-frequency mapping. To preclude the one or more resource elements or symbol/subcarrier combinations, the BS and/or wireless communication device 2 may determine a rate matching output length, for the data transmission, based at least in part on refraining from mapping coded bits, associated with the ZP-DMRS, to the one or more resource elements or symbol/subcarrier combinations. In this way, the transmit power, for the ZP-DMRS in the one or more resource elements or symbol/subcarrier combinations, is configured to be at or near zero transmit power.

To determine the rate matching output length, the BS and/or wireless communication device 2 may subtract the quantity of the resource elements or symbol/subcarrier combinations from the total quantity of resource elements or symbol/subcarrier combinations in the full-duplex time-frequency resource, multiply the remaining resource element or symbol/subcarrier combinations by a modulation order for the data transmission (e.g., 2 for binary phase-shift keying (BPSK), 4 for 16 quadrature amplitude modulation (16QAM), 6 for 64 quadrature amplitude modulation (64QAM), 8 for 256 quadrature amplitude modulation (256QAM), 10 for 1024 quadrature amplitude modulation (1024QAM), 12 for 4096 quadrature amplitude modulation (4096QAM), and/or the like), and multiply the resulting product by the spatial multiplexing degree for the data transmission.

As further shown in FIG. 6A, and by reference number 610, rate dematching may be performed for the downlink data transmission and/or the uplink data transmission. For example, wireless communication device 1 may receive the indication of the time-frequency mapping for the downlink ZP-DMRS, and the downlink data transmission, and may rate dematch the downlink data transmission based at least in part on the time-frequency mapping for the downlink ZP-DMRS (reference number 610-1). As another example, the BS may receive the uplink data transmission, and may rate dematch the uplink data transmission based at least in part on the time-frequency mapping for the uplink ZP-DMRS (reference number 610-2).

In some aspects, the BS and/or wireless communication device 1 may rate dematch a data transmission based at least in part on identifying one or more resource elements or symbol/subcarrier combinations, included in the full-duplex time-frequency resource and indicated by a time-frequency mapping associated with a ZP-DMRS, that have been precluded from the data transmission. In this case, the BS and/or wireless communication device 1 may determine a rate dematching output length, for the data transmission, based at least in part on refraining from mapping coded bits, associated with the ZP-DMRS, to the one or more resource elements or symbol/subcarrier combinations. In this way, the receive power, for the ZP-DMRS in the one or more resource elements or symbol/subcarrier combinations, is configured to be at or near zero receive power.

To determine the rate dematching output length, the BS and/or wireless communication device 1 may subtract the quantity of the resource elements or symbol/subcarrier combinations, multiply the remaining resource element or symbol/subcarrier combinations by a modulation order for the data transmission (e.g., 2 for binary phase-shift keying (BPSK), 4 for 16 quadrature amplitude modulation (16QAM), 6 for 64 quadrature amplitude modulation (64QAM), 8 for 256 quadrature amplitude modulation (256QAM), 10 for 1024 quadrature amplitude modulation (1024QAM), 12 for 4096 quadrature amplitude modulation (4096QAM), and/or the like), and multiply the resulting product by the spatial multiplexing degree for the data transmission.

FIG. 6B illustrates an example full-duplex physical resource block (PRB), in which the techniques described above in connection with FIG. 6A may be implemented. The example full-duplex PRB illustrated in FIG. 6B may be an example of a full-duplex time-frequency resource. The techniques described above in connection with FIG. 6A may be implemented in other full-duplex PRBs and/or other full-duplex time-frequency resources.

As shown in FIG. 6B, the downlink configuration for the full-duplex PRB may include a front-loaded PDCCH transmission (e.g. symbols 0 and 1), a front-loaded PDSCH DMRS transmission (e.g., symbol 3), a plurality of other PDSCH DMRS transmissions (e.g., symbols 7 and 11), and a downlink or PDSCH data transmission (e.g., symbols 3-6, 8-10, 12, and 13). The uplink configuration for the full-duplex PRB may include a front-loaded PUCCH transmission (e.g. symbols 0 and 1), unused symbols (e.g., symbols 2 and 3), a front-loaded PUSCH DMRS transmission (e.g., symbol 4), another PUSCH DMRS transmission (e.g., symbol 12), and an uplink or PUSCH data transmission (e.g., symbols 4-6, 8-10, 12, and 13).

As further shown in FIG. 6B, due to the front-loaded PUSCH DMRS transmission being mapped to the same resource elements or symbol/subcarrier combinations in symbol 4 of the full-duplex PRB as a portion of the downlink data transmission (which may be referred to as a collision), the resource elements or symbol/subcarrier combinations in symbol 4 of the downlink configuration for the full-duplex PRB may be replaced with a PDSCH ZP-DMRS. Similarly, due to a PUSCH DMRS transmission being mapped to the same resource elements or symbol/subcarrier combinations in symbol 12 of the full-duplex PRB as a portion of the downlink data transmission, the resource elements or symbol/subcarrier combinations in symbol 12 of the downlink configuration for the full-duplex PRB may be replaced with another PDSCH ZP-DMRS.

As further shown in FIG. 6B, due to a PDSCH DMRS transmission being mapped to the same resource elements or symbol/subcarrier combinations in symbol 7 of the full-duplex PRB as a portion of the uplink data transmission, the resource elements or symbol/subcarrier combinations in symbol 7 of the uplink configuration for the full-duplex PRB may be replaced with a PUSCH ZP-DMRS. Similarly, due to a PDSCH DMRS transmission being mapped to the same resource elements or symbol/subcarrier combinations in symbol 11 of the full-duplex PRB as a portion of the uplink data transmission, the resource elements or symbol/subcarrier combinations in symbol 11 of the uplink configuration for the full-duplex PRB may be replaced with another PUSCH ZP-DMRS.

In this way, the BS may identify a collision between a data transmission and a DMRS transmission in a full-duplex time-frequency resource. The BS may configure a ZP-DMRS based at least in part on identifying the collision. The BS may configure the ZP-DMRS such that a time-frequency mapping for the ZP-DMRS is the same as a time-frequency mapping for the DMRS transmission and the data transmission. In other words, in the symbols and subcarriers in which the data transmission and the DMRS transmission collide, the BS configures the ZP-DMRS to replace the data transmission in the symbols and subcarriers. In this way, the symbols and subcarriers occupied by the ZP-DMRS are precluded when rate matching and/or rate dematching is performed for the data transmission, which reduces or prevents power boosting caused by the simultaneous transmission and reception of the data transmission and the DMRS transmission, respectively. This reduces self-interference and/or inter-device interference, which improves DMRS-based channel estimation performance based at least in part on the DMRS transmission, improves signal reception and decoding performance, increases data throughput, and/or the like.

As indicated above, FIGS. 6A and 6B are provided as examples. Other examples may differ from what is described with respect to FIGS. 6A and 6B.

Figure 7:
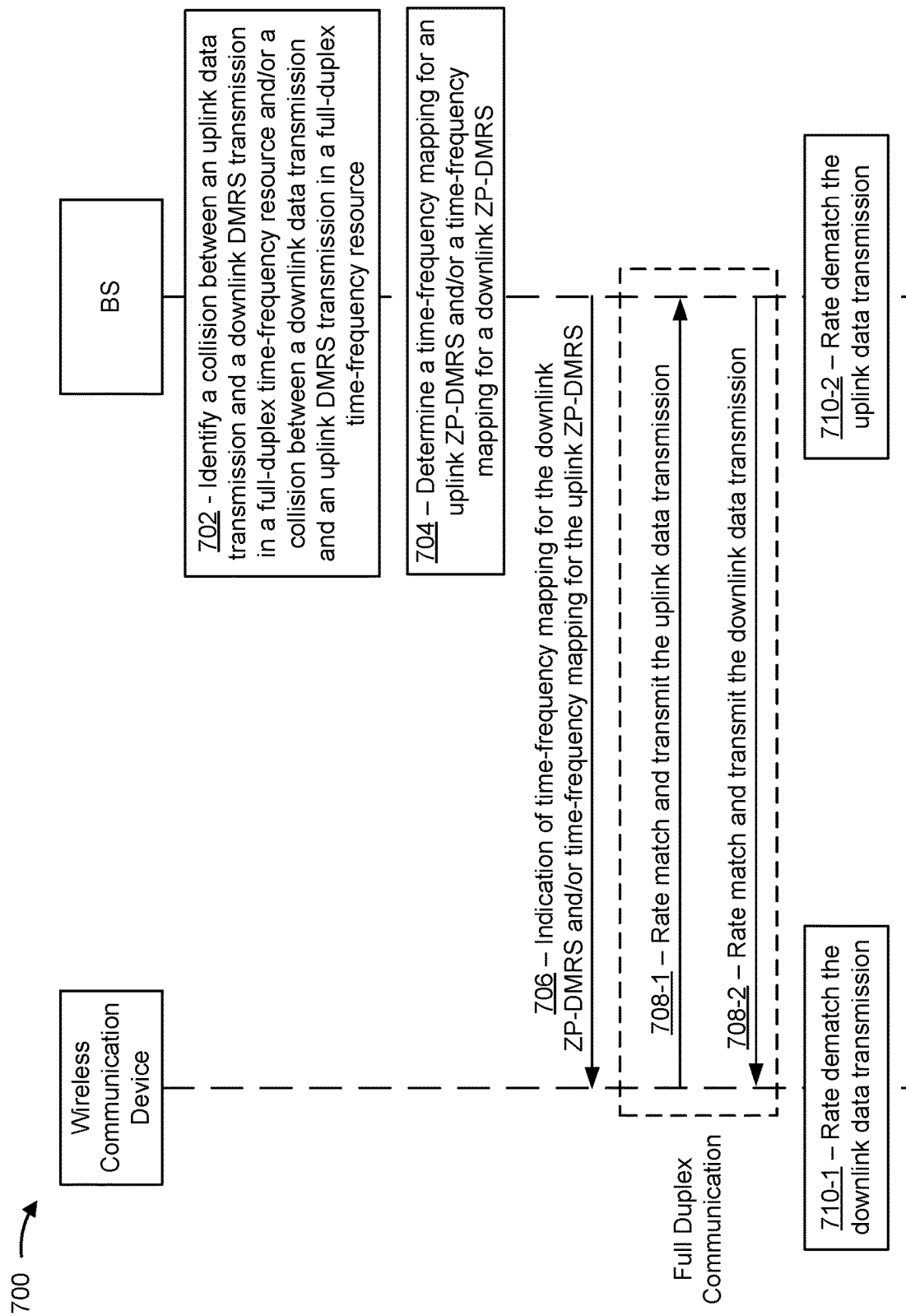

FIG. 7 is a diagram illustrating an example 700 of DMRS for full-duplex communication, in accordance with various aspects of the present disclosure. As shown in FIG. 7, example 700 may include communication between a BS (e.g., BS 110) and a full-duplex capable wireless communication device (e.g., UE 120, BS 110, and/or the like).

In some aspects, the BS and the wireless communication device may be included in a full-duplex deployment, such as one or more of the example full-duplex deployment scenarios illustrated above in FIGS. 5A-5C and/or other full-duplex deployment scenarios. For example, the wireless communication device may be a full-duplex UE that communicates with the BS (e.g., as illustrated in FIG. 5B and/or FIG. 5C). As another example, the BS may be an IAB node and the wireless communication device 1 may be an IAB donor or another IAB node (e.g., parent IAB node or child IAB node) implemented by another BS (e.g., as illustrated in FIG. 5B or FIG. 5C).

In some aspects, the BS and the wireless communication device may communicate using full-duplex and non-full-duplex communication, such as half duplex and/or other types of non-full-duplex communication. In some aspects, the BS and the wireless communication device may transmit and/or receive data transmissions (e.g., downlink or PDSCH data transmissions and/or uplink or PUSCH data transmissions) and/or control communications (e.g., downlink or PDCCH control transmissions and/or uplink or PUSCH control transmissions). In some aspects, the BS and the wireless communication device may transmit and/or receive one or more types of reference signals, such as a CSI-RS, a DMRS, and/or the like.

In some aspects, the BS may function as a scheduling entity for the wireless communication device. In this case, the BS may schedule the full-duplex and non-full-duplex communication between the BS and the wireless communication device.

As shown in FIG. 7, and by reference number 702, as part of scheduling full-duplex communication between the BS and the wireless communication device, the BS may identify one or more collisions between data transmissions and DMRS transmissions. For example, the BS may identify a collision between an uplink (or PUSCH) data transmission and a downlink (or PDSCH) DMRS transmission in a full-duplex time-frequency resource and/or may identify a collision between a downlink (or PDSCH) data transmission and an uplink (or PUSCH) DMRS transmission in a full-duplex time-frequency resource (e.g., the same full-duplex time-frequency resource as the collision between the uplink data transmission and the downlink DMRS transmission and/or another full-duplex time-frequency resource).

As further shown in FIG. 7, and by reference number 704, the BS may determine a time-frequency mapping for an uplink (or PUSCH) ZP-DMRS (e.g., based at least in part on detecting a collision between an uplink data transmission and a downlink DMRS transmission) and/or a time-frequency mapping for a downlink (or PDSCH) ZP-DMRS (e.g., based at least in part on detecting a collision between a downlink data transmission and an uplink DMRS transmission). The time-frequency mapping for the uplink ZP-DMRS may be the same as the time-frequency mapping for the downlink DMRS, and the time-frequency mapping for the downlink ZP-DMRS may be the same as the time-frequency mapping for the uplink DMRS. The time-frequency mapping for the uplink ZP-DMRS may indicate or specify the resource elements or symbol/subcarrier combinations to which the uplink ZP-DMRS is mapped. Similarly, the time-frequency mapping for the downlink ZP-DMRS may indicate or specify the resource elements or symbol/subcarrier combinations to which the downlink ZP-DMRS is mapped.

As indicated above, a collision between a data transmission and a DMRS transmission may cause an increase in transmit power and/or receive power associated with the data transmission, which may cause interference with the DMRS transmission and degraded channel estimation performance based at least in part on the DMRS transmission. Accordingly, in the resource elements or symbol/subcarrier combinations in which the uplink data transmission collides with the downlink DMRS transmission, the BS may replace the uplink data transmission with the uplink ZP-DMRS. Moreover, in the resource elements or symbol/subcarrier combinations in which the downlink data transmission collides with the uplink DMRS transmission, the BS may replace the downlink data transmission with the downlink ZP-DMRS.

In some aspects, the BS may determine the time-frequency mapping for the uplink ZP-DMRS based at least in part on detecting the collision between the uplink data transmission and the downlink DMRS transmission, and/or may determine the time-frequency mapping for the downlink ZP-DMRS based at least in part on detecting the collision between the downlink data transmission and the uplink DMRS transmission. In some aspects, the BS may determine the time-frequency mapping for the uplink ZP-DMRS based at least in part on determining that the collision between the uplink data transmission and the downlink DMRS transmission is to result in interference that satisfies an interference threshold, and/or may determine the time-frequency mapping for the downlink ZP-DMRS based at least in part on determining that the collision between the downlink data transmission and the uplink DMRS transmission is to result in interference that satisfies the same interference threshold or a different interference threshold. The interference threshold(s) may include a self-interference threshold, an inter-device interference threshold, a signal-to-interference-plus-noise ratio (SINR) threshold, and/or another type of interference threshold.

As further shown in FIG. 7, and by reference number 706, the BS may transmit an indication of the time-frequency mapping for the downlink ZP-DMRS and/or an indication of the time-frequency mapping for the uplink ZP-DMRS to the wireless communication device. In this way, the wireless communication device may rate dematch the downlink data transmission based at least in part on the indication of the time-frequency mapping for the downlink ZP-DMRS, and/or may rate match the uplink data transmission based at least in part on the indication of the time-frequency mapping for the uplink ZP-DMRS.

In some aspects, the BS may transmit an indication of a time-frequency mapping for a ZP-DMRS (e.g., for the downlink ZP-DMRS and/or the uplink ZP-DMRS) in one or more signaling communications, such as one or more RRC communications, one or more MAC-CE communications, one or more DCI communications, and/or the like.

In some aspects, an indication of a time-frequency mapping for a ZP-DMRS may identify the resource elements or symbol/subcarrier combinations to which the ZP-DMRS is mapped. For example, an indication of a time-frequency mapping for a ZP-DMRS may identify the symbol indexes associated with the resource elements or symbol/subcarrier combinations to which the ZP-DMRS is mapped, may identify the resource block indexes associated with the resource elements or symbol/subcarrier combinations to which the ZP-DMRS is mapped, may identify the resource element indexes associated with the resource elements or symbol/subcarrier combinations to which the ZP-DMRS is mapped, and/or the like.

In some aspects, an indication of a time-frequency mapping for a ZP-DMRS may include a bitmap that indicates respective locations of the resource elements or symbol/subcarrier combinations to which the ZP-DMRS is mapped. The length of the bitmap may be based at least in part on a quantity of symbols included in the physical channel of the data transmission associated with the ZP-DMRS, may be based at least in part on a quantity of physical resource blocks included in the physical channel of the data transmission associated with the ZP-DMRS, may be based at least in part on a quantity of resource elements included in the physical channel of the data transmission associated with the ZP-DMRS, and/or the like.

In some aspects, an indication of a time-frequency mapping for a ZP-DMRS may be included in a DMRS configuration for a DMRS transmission that collides with a data transmission associated with the ZP-DMRS. For example, an indication of the time-frequency mapping for the uplink ZP-DMRS may be included in a DMRS configuration for the downlink DMRS transmission that collides with the uplink data transmission. As another example, an indication of the time-frequency mapping for the downlink ZP-DMRS may be included in a DMRS configuration for the uplink DMRS transmission that collides with the downlink data transmission. In this case, since the time-frequency mapping for the ZP-DMRS is the same time-frequency mapping for the DMRS transmission, the BS may transmit or forward the DMRS configuration for the DMRS transmission as an indication of the time-frequency mapping for the ZP-DMRS.

Accordingly, the BS may transmit or forward, to the wireless communication device, an indication of the DMRS configuration for the uplink DMRS transmission, which may serve as the indication of the time-frequency mapping for the downlink ZP-DMRS. Similarly, the BS may transmit or forward, to the wireless communication device, an indication of the DMRS configuration for the downlink DMRS transmission, which may server as the indication of the time-frequency mapping for the uplink ZP-DMRS.

In some aspects, the BS may transmit an indication of a time-frequency mapping for a ZP-DMRS in a plurality of signaling communications. For example, the BS may transmit an indication of a plurality of candidate time-frequency mappings for a ZP-DMRS in a static signaling communication (e.g., an RRC communication) or a semi-static signaling communication (e.g., a MAC-CE communication), and may transmit a dynamic signaling communication (e.g., a DCI communication) that identifies or selects the time-frequency mapping for the ZP-DMRS from among the plurality of candidate time-frequency mappings by indexing into the plurality of candidate time-frequency mappings.

As another example, the BS may transmit an indication of a plurality of candidate DMRS configurations for a ZP-DMRS in a static signaling communication (e.g., an RRC communication) or a semi-static signaling communication (e.g., a MAC-CE communication), and may transmit a dynamic signaling communication (e.g., a DCI communication) that identifies or selects the DMRS configuration for the ZP-DMRS from among the plurality of candidate DMRS configurations by indexing into the plurality of candidate DMRS configurations.

As another example, the BS may transmit an indication of a first subset of parameters for a DMRS configuration for a ZP-DMRS in a static signaling communication (e.g., an RRC communication) or a semi-static signaling communication (e.g., a MAC-CE communication), and may transmit a dynamic signaling communication (e.g., a DCI communication) that identifies a second subset of parameters for a DMRS configuration for a ZP-DMRS. The first subset of parameters may include a timing mapping type for the DMRS transmission (e.g., Type A DMRS mapping or Type B DMRS mapping), a frequency configuration type for the DMRS transmission (e.g., Type 1 configuration or Type 2 configuration), a quantity of front-loaded DMRS symbols, a quantity of additional DMRS symbols, and/or the like. The second subset of parameters may include indexes of code division multiplexing groups for the DMRS transmission, time-frequency resource locations for the DMRS transmission, and/or the like.

As further shown in FIG. 7, and by reference number 708, the BS and the wireless communication device may perform full-duplex communication based at least in part on the time-frequency mapping for the downlink ZP-DMRS and/or the time-frequency mapping for the uplink ZP-DMRS. For example, the BS may rate match and transmit the downlink data transmission based at least in part on the time-frequency mapping for the downlink ZP-DMRS (reference number 708-1). As another example, the wireless communication device may receive the indication of the time-frequency mapping for the uplink ZP-DMRS, and may rate match and transmit the uplink data transmission based at least in part on the time-frequency mapping for the uplink ZP-DMRS (reference number 708-2).

In some aspects, the BS and/or the wireless communication device may rate match a data transmission based at least in part on a time-frequency mapping for a ZP-DMRS by precluding, from the data transmission, one or more resource elements or symbol/subcarrier combinations included in the full-duplex time-frequency resource and indicated by the time-frequency mapping. To preclude the one or more resource elements or symbol/subcarrier combinations, the BS and/or the wireless communication device may determine a rate matching output length, for the data transmission, based at least in part on refraining from mapping coded bits, associated with the ZP-DMRS, to the one or more resource elements or symbol/subcarrier combinations. In this way, the transmit power, for the ZP-DMRS in the one or more resource elements or symbol/subcarrier combinations, is configured to be at or near zero transmit power.

To determine the rate matching output length, the BS and/or the wireless communication device may subtract the quantity of the resource elements or symbol/subcarrier combinations from the total quantity of resource elements or symbol/subcarrier combinations in the full-duplex time-frequency resource, multiply the remaining resource element or symbol/subcarrier combinations by a modulation order for the data transmission (e.g., 2 for BPSK, 4 for 16QAM, 6 for 64QAM, 8 for 256QAM, 10 for 1024QAM, 12 for 4096QAM, and/or the like), and multiply the resulting product by the spatial multiplexing degree for the data transmission.

As further shown in FIG. 7, and by reference number 710, rate dematching may be performed for the downlink data transmission and/or the uplink data transmission. For example, the wireless communication device may receive the indication of the time-frequency mapping for the downlink ZP-DMRS, and the downlink data transmission, and may rate dematch the downlink data transmission based at least in part on the time-frequency mapping for the downlink ZP-DMRS (reference number 710-1). As another example, the BS may receive the uplink data transmission, and may rate dematch the uplink data transmission based at least in part on the time-frequency mapping for the uplink ZP-DMRS (reference number 710-2).

In some aspects, the BS and/or the wireless communication device may rate dematch a data transmission based at least in part on identifying one or more resource elements or symbol/subcarrier combinations, included in the full-duplex time-frequency resource and indicated by a time-frequency mapping associated with a ZP-DMRS, that have been precluded from the data transmission. In this case, the BS or the wireless communication device may determine a rate dematching output length, for the data transmission, based at least in part on refraining from mapping coded bits, associated with the ZP-DMRS, to the one or more resource elements or symbol/subcarrier combinations. In this way, the receive power, for the ZP-DMRS in the one or more resource elements or symbol/subcarrier combinations, is configured to be at or near zero receive power.

To determine the rate dematching output length, the BS and/or the wireless communication device may subtract the quantity of the resource elements or symbol/subcarrier combinations, multiply the remaining resource element or symbol/subcarrier combinations by a modulation order for the data transmission (e.g., 2 for binary phase-shift keying (BPSK), 4 for 16 quadrature amplitude modulation (16QAM), 6 for 64 quadrature amplitude modulation (64QAM), 8 for 256 quadrature amplitude modulation (256QAM), 10 for 1024 quadrature amplitude modulation (1024QAM), 12 for 4096 quadrature amplitude modulation (4096QAM), and/or the like), and multiply the resulting product by the spatial multiplexing degree for the data transmission.

In this way, the BS may identify a collision between a data transmission and a DMRS transmission in a full-duplex time-frequency resource. The BS may configure a ZP-DMRS based at least in part on identifying the collision. The BS may configure the ZP-DMRS such that a time-frequency mapping for the ZP-DMRS is the same as a time-frequency mapping for the DMRS transmission and the data transmission. In other words, in the symbols and subcarriers in which the data transmission and the DMRS transmission collide, the BS configures the ZP-DMRS to replace the data transmission in the symbols and subcarriers. In this way, the symbols and subcarriers occupied by the ZP-DMRS are precluded when rate matching and/or rate dematching is performed for the data transmission, which reduces or prevents power boosting caused by the simultaneous transmission and reception of the data transmission and the DMRS transmission, respectively. This reduces self-interference and/or inter-device interference, which improves DMRS-based channel estimation performance based at least in part on the DMRS transmission, improves signal reception and decoding performance, increases data throughput, and/or the like.

As indicated above, FIG. 7 is provided as an example. Other examples may differ from what is described with respect to FIG. 7.

Figure 8:
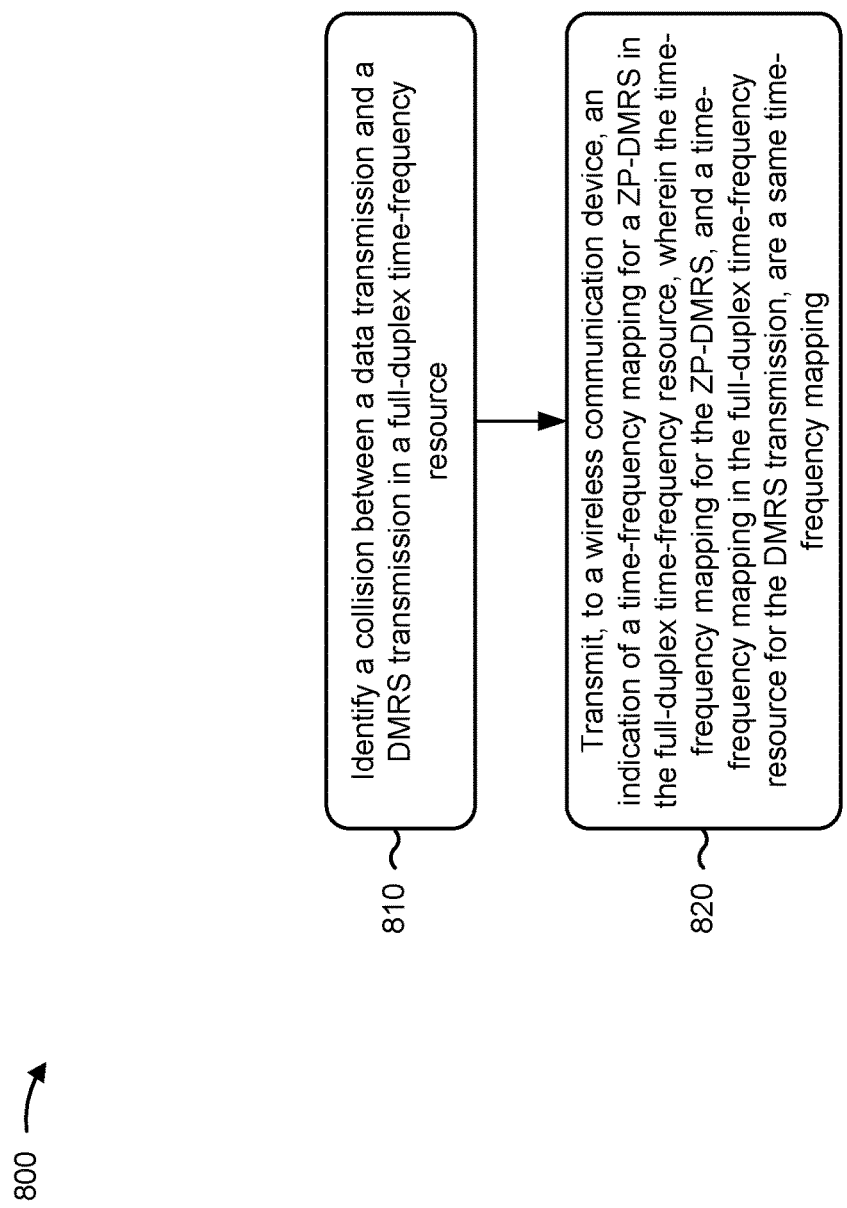
FIG. 8 is a diagram illustrating an example process performed, for example, by a BS, in accordance with various aspects of the present disclosure.

FIG. 8 is a diagram illustrating an example process 800 performed, for example, by a BS, in accordance with various aspects of the present disclosure. Example process 800 is an example where a BS (e.g., BS 110 and/or the like) performs operations associated with DMRS for full-duplex communication.

As shown in FIG. 8, in some aspects, process 800 may include identifying a collision between a data transmission and a DMRS transmission in a full-duplex time-frequency resource (block 810). For example, the BS (e.g., using transmit processor 220, receive processor 238, controller/processor 240, memory 242, and/or the like) may identify a collision between a data transmission and a DMRS transmission in a full-duplex time-frequency resource, as described above.

As further shown in FIG. 8, in some aspects, process 800 may include transmitting, to a wireless communication device, an indication of a time-frequency mapping for a ZP-DMRS in the full-duplex time-frequency resource, wherein the time-frequency mapping for the ZP-DMRS, and a time-frequency mapping in the full-duplex time-frequency resource for the DMRS transmission, are a same time-frequency mapping (block 820). For example, the BS (e.g., using transmit processor 220, receive processor 238, controller/processor 240, memory 242, and/or the like) may transmit, to a wireless communication device, an indication of a time-frequency mapping for a ZP-DMRS in the full-duplex time-frequency resource, as described above. In some aspects, the time-frequency mapping for the ZP-DMRS, and a time-frequency mapping in the full-duplex time-frequency resource for the DMRS transmission, are a same time-frequency mapping.

Process 800 may include additional aspects, such as any single aspect or any combination of aspects described below and/or in connection with one or more other processes described elsewhere herein.

In a first aspect, the data transmission comprises a physical downlink shared channel (PDSCH) data transmission, the DMRS transmission comprises a PUSCH DMRS transmission, and the ZP-DMRS comprises a PDSCH ZP-DMRS. In a second aspect, alone or in combination with the first aspect, process 800 further comprises rate matching the PDSCH data transmission by precluding, from the PDSCH data transmission, one or more resource elements, of the full-duplex time-frequency resource, associated with the PDSCH ZP-DMRS, the one or more resource elements being based at least in part on the time-frequency mapping of the PDSCH ZP-DMRS, and performing the PDSCH data transmission based at least in part on rate matching the PDSCH data transmission.

In a third aspect, alone or in combination with one or more of the first and second aspects, rate matching the PDSCH data transmission by precluding one or more resource elements from the PDSCH data transmission comprises determining a rate matching output length, for the PDSCH data transmission, based at least in part on refraining from mapping coded bits, associated with the PDSCH ZP-DMRS, from the one or more resource elements. In a fourth aspect, alone or in combination with one or more of the first through third aspects, the data transmission comprises a PUSCH data transmission, the DMRS transmission comprises a PDSCH DMRS transmission, and the ZP-DMRS comprises a PUSCH ZP-DMRS.

In a fifth aspect, alone or in combination with one or more of the first through fourth aspects, process 800 further comprises receiving the PUSCH data transmission from the wireless communication device, the PUSCH data transmission being rate matched such that one or more resource elements of the full-duplex time-frequency resource, associated with the PUSCH ZP-DMRS, are precluded from the PUSCH data transmission, and the one or more resource elements are based at least in part on the time-frequency mapping of the PUSCH ZP-DMRS, and rate dematching the PUSCH data transmission is based at least in part on the one or more resource elements being precluded from the PUSCH data transmission. In a sixth aspect, alone or in combination with one or more of the first through fifth aspects, rate dematching the PUSCH data transmission comprises determining a rate dematching output length, for the PUSCH data transmission, based at least in part on refraining from mapping coded bits, associated with the PUSCH ZP-DMRS, from the one or more resource elements.

In a seventh aspect, alone or in combination with one or more of the first through sixth aspects, process 800 further comprises identifying another collision between a PDSCH data transmission and another DMRS transmission in the full-duplex time-frequency resource, the other DMRS transmission comprising a PUSCH DMRS transmission, and transmitting, to another wireless communication device, an indication of a time-frequency mapping for a PDSCH ZP-DMRS in the full-duplex time-frequency resource, the time-frequency mapping for the PDSCH ZP-DMRS, and a time-frequency mapping in the full-duplex time-frequency resource for the other DMRS transmission, being a same time-frequency mapping.

In an eighth aspect, alone or in combination with one or more of the first through seventh aspects, the wireless communication device comprises a first UE, and the other wireless communication device comprises a second UE. In a ninth aspect, alone or in combination with one or more of the first through eighth aspects, the BS comprises an IAB node, the wireless communication device comprises a UE or a child IAB node, and the other wireless communication device comprises an IAB donor or a parent IAB node. In a tenth aspect, alone or in combination with one or more of the first through ninth aspects, the BS comprises an IAB node, the wireless communication device comprises an IAB donor or a parent IAB node, and the other wireless communication device comprises a UE or a child IAB node.

In an eleventh aspect, alone or in combination with one or more of the first through tenth aspects, process 800 further comprises identifying another collision, between a PDSCH data transmission and another DMRS transmission, in the full-duplex time-frequency resource, the other DMRS transmission comprising a PUSCH DMRS transmission, and transmitting, to the wireless communication device, an indication of a time-frequency mapping for a PDSCH ZP-DMRS in the full-duplex time-frequency resource, the time-frequency mapping for the PDSCH ZP-DMRS, and a time-frequency mapping in the full-duplex time-frequency resource for the other DMRS transmission, being a same time-frequency mapping. In a twelfth aspect, alone or in combination with one or more of the first through eleventh aspects, the wireless communication device comprises a full-duplex capable UE.

In a thirteenth aspect, alone or in combination with one or more of the first through twelfth aspects, process 800 further comprises determining that the collision between the data transmission and the DMRS transmission is to result in interference that satisfies an interference threshold, and transmitting the indication of the time-frequency mapping for the ZP-DMRS comprises transmitting the indication of the time-frequency mapping for the ZP-DMRS based at least in part on determining that the collision between the data transmission and the DMRS transmission is to result in interference that satisfies the interference threshold. In a fourteenth aspect, alone or in combination with one or more of the first through thirteenth aspects, the time-frequency mapping for the ZP-DMRS includes one or more resource elements, in the full-duplex time-frequency resource, associated with the ZP-DMRS.

In a fifteenth aspect, alone or in combination with one or more of the first through fourteenth aspects, transmitting the indication of the time-frequency mapping for the ZP-DMRS comprises transmitting an indication of at least one of symbol indexes associated with the one or more resource elements, resource block indexes associated with the one or more resource elements, or resource element indexes associated with the one or more resource elements. In a sixteenth aspect, alone or in combination with one or more of the first through fifteenth aspects, transmitting the indication of the time-frequency mapping for the ZP-DMRS comprises transmitting a bitmap that indicates respective locations of the one or more resource elements.

In a seventeenth aspect, alone or in combination with one or more of the first through sixteenth aspects, the indication of the time-frequency mapping for the ZP-DMRS is included in a DMRS configuration for the DMRS transmission, and transmitting the indication of the time-frequency mapping for the ZP-DMRS comprises transmitting an indication of the DMRS configuration to the wireless communication device. In an eighteenth aspect, alone or in combination with one or more of the first through seventeenth aspects, transmitting the indication of the DMRS configuration comprises transmitting an indication of a first subset of parameters, included in the DMRS configuration, in a static or semi-static signaling communication; and transmitting an indication of a second subset of parameters, included in the DMRS configuration, in a dynamic signaling communication.

In a nineteenth aspect, alone or in combination with one or more of the first through eighteenth aspects, transmitting the indication of the DMRS configuration comprises transmitting an indication of a plurality of candidate DMRS configurations in a static or semi-static signaling communication; and transmitting, in a dynamic signaling communication, an indication of a selection of the DMRS configuration from the plurality of candidate DMRS configurations.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a wireless communication device, in accordance with various aspects of the present disclosure. Example process 900 is an example where a wireless communication device (e.g., UE 120, BS 110, and/or the like) performs operations associated with DMRS for full-duplex communication.

As shown in FIG. 9, in some aspects, process 900 may include receiving, from a BS and based at least in part on a collision between a data transmission and a DMRS transmission in a full-duplex time-frequency resource, an indication of a time-frequency mapping for a ZP-DMRS in the full-duplex time-frequency resource, wherein the time-frequency mapping for the ZP-DMRS, and a time-frequency mapping in the full-duplex time-frequency resource for the DMRS transmission, are a same time-frequency mapping (block 910). For example, the UE (e.g., using receive processor 258, transmit processor 264, controller/processor 280, memory 282, and/or the like) may receive, from a BS and based at least in part on a collision between a data transmission and a DMRS transmission in a full-duplex time-frequency resource, an indication of a time-frequency mapping for a ZP-DMRS in the full-duplex time-frequency resource, as described above. In some aspects, the time-frequency mapping for the ZP-DMRS, and a time-frequency mapping in the full-duplex time-frequency resource for the DMRS transmission, are a same time-frequency mapping.

As shown in FIG. 9, in some aspects, process 900 may include rate matching the data transmission based at least in part on the time-frequency mapping for the ZP-DMRS (block 920). For example, the UE (e.g., using receive processor 258, transmit processor 264, controller/processor 280, memory 282, and/or the like) may rate match the data transmission based at least in part on the time-frequency mapping for the ZP-DMRS, as described above.

As shown in FIG. 9, in some aspects, process 900 may include receiving, from the BS, the data transmission based at least in part on the data transmission being rate matched based at least in part on the time-frequency mapping for the ZP-DMRS (block 930). For example, the UE (e.g., using receive processor 258, transmit processor 264, controller/processor 280, memory 282, and/or the like) may receive, from the BS, the data transmission based at least in part on the data transmission being rate matched based at least in part on the time-frequency mapping for the ZP-DMRS, as described above.

Process 900 may include additional aspects, such as any single aspect or any combination of aspects described below and/or in connection with one or more other processes described elsewhere herein.

In a first aspect, the data transmission comprises PDSCH data transmission, the DMRS transmission comprises a PUSCH DMRS transmission, the ZP-DMRS comprises a PDSCH ZP-DMRS, and rate matching the data transmission based at least in part on the time-frequency mapping for the ZP-DMRS, or receiving the data transmission based at least in part on the data transmission being rate matched based at least in part on the time-frequency mapping for the ZP-DMRS, comprises receiving the PDSCH data transmission based at least in part on the PDSCH data transmission being rate matched based at least in part on the time-frequency mapping for the PDSCH ZP-DMRS.

In a second aspect, alone or in combination with the first aspect, the PDSCH data transmission is rate matched such that one or more resource elements of the full-duplex time-frequency resource, associated with the PDSCH ZP-DMRS, are precluded from the PDSCH data transmission, the one or more resource elements are based at least in part on the time-frequency mapping of the PDSCH ZP-DMRS, and process 900 further comprises rate dematching the PDSCH data transmission based at least in part on the one or more resource elements being precluded from the PDSCH data transmission.

In a third aspect, alone or in combination with one or more of the first and second aspects, rate dematching the PDSCH data transmission comprises determining a rate dematching output length, for the PDSCH data transmission, based at least in part on refraining from mapping coded bits, associated with the PDSCH ZP-DMRS, from the one or more resource elements. In a fourth aspect, alone or in combination with one or more of the first through third aspects, the data transmission comprises a PUSCH data transmission, the DMRS transmission comprises PDSCH DMRS transmission, the ZP-DMRS comprises PUSCH ZP-DMRS, and rate matching the data transmission based at least in part on the time-frequency mapping for the ZP-DMRS, or receiving the data transmission based at least in part on the data transmission being rate matched based at least in part on the time-frequency mapping for the ZP-DMRS, comprises rate matching the PUSCH data transmission based at least in part on the time-frequency mapping for the PUSCH ZP-DMRS.

In a fifth aspect, alone or in combination with one or more of the first through fourth aspects, rate matching the PUSCH data transmission based at least in part on the time-frequency mapping for the PUSCH ZP-DMRS comprises precluding, from the PUSCH data transmission, one or more resource elements, of the full-duplex time-frequency resource, associated with the PUSCH ZP-DMRS, the one or more resource elements being based at least in part on the time-frequency mapping of the PUSCH ZP-DMRS, and the method further comprises performing the PUSCH data transmission based at least in part on rate matching the PUSCH data transmission. In a sixth aspect, alone or in combination with one or more of the first through fifth aspects, precluding the one or more resource elements from the PUSCH data transmission comprises determining a rate matching output length, for the PUSCH data transmission, based at least in part on refraining from mapping coded bits, associated with the PUSCH ZP-DMRS, from the one or more resource elements.

In a seventh aspect, alone or in combination with one or more of the first through sixth aspects, process 900 further comprises receiving, from the BS and based at least in part on a collision between a PDSCH data transmission and a PUSCH DMRS transmission in the full-duplex time-frequency resource, an indication of a time-frequency mapping for a PDSCH ZP-DMRS in the full-duplex time-frequency resource, the time-frequency mapping for the PDSCH ZP-DMRS, and a time-frequency mapping in the full-duplex time-frequency resource for the PUSCH DMRS transmission, being a same time-frequency mapping, and receiving, from the BS, the PDSCH data transmission based at least in part on the PDSCH data transmission being rate matched based at least in part on the time-frequency mapping for the PDSCH ZP-DMRS.

In an eighth aspect, alone or in combination with one or more of the first through seventh aspects, the wireless communication device comprises a full-duplex capable UE. In a ninth aspect, alone or in combination with one or more of the first through eighth aspects, the wireless communication device comprises a UE. In a tenth aspect, alone or in combination with one or more of the first through ninth aspects, the wireless communication device comprises an IAB donor, an IAB node, or a UE, and the BS comprises an IAB node. In an eleventh aspect, alone or in combination with one or more of the first through tenth aspects, the time-frequency mapping for the ZP-DMRS includes one or more resource elements, in the full-duplex time-frequency resource, associated with the ZP-DMRS.

In a twelfth aspect, alone or in combination with one or more of the first through eleventh aspects, receiving the indication of the time-frequency mapping for the ZP-DMRS comprises receiving an indication of at least one of symbol indexes associated with the one or more resource elements, resource block indexes associated with the one or more resource elements, or resource element indexes associated with the one or more resource elements. In a thirteenth aspect, alone or in combination with one or more of the first through twelfth aspects, receiving the indication of the time-frequency mapping for the ZP-DMRS comprises receiving a bitmap that indicates respective locations of the one or more resource elements. In a fourteenth aspect, alone or in combination with one or more of the first through thirteenth aspects, the indication of the time-frequency mapping for the ZP-DMRS is included in a DMRS configuration for the DMRS transmission, and receiving the indication of the time-frequency mapping for the ZP-DMRS comprises receiving an indication of the DMRS configuration from the BS.

In a fifteenth aspect, alone or in combination with one or more of the first through fourteenth aspects, receiving the indication of the DMRS configuration comprises receiving an indication of a first subset of parameters, included in the DMRS configuration, in a static or semi-static signaling communication; and receiving an indication of a second subset of parameters, included in the DMRS configuration, in a dynamic signaling communication. In a sixteenth aspect, alone or in combination with one or more of the first through fifteenth aspects, receiving the indication of the DMRS configuration comprises receiving an indication of a plurality of candidate DMRS configurations in a static or semi-static signaling communication and receiving, in a dynamic signaling communication, an indication of a selection of the DMRS configuration from the plurality of candidate DMRS configurations, the dynamic signaling communication indexing into the plurality of candidate DMRS configurations.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a network entity, comprising:
   identifying a collision between a data transmission and a demodulation reference signal (DMRS) transmission in a full-duplex time-frequency resource;
   determining a time-frequency mapping for a zero-power DMRS (ZP-DMRS) in the full-duplex time-frequency resource based at least in part on the identified collision; and
   transmitting, to a wireless communication device, an indication of the time-frequency mapping for the ZP-DMRS in the full-duplex time-frequency resource,
      wherein the time-frequency mapping for the ZP-DMRS, and a time-frequency mapping in the full-duplex time-frequency resource for the DMRS transmission, are a same time-frequency mapping.

2. The method of claim 1,
   wherein the data transmission comprises:
      a physical downlink shared channel (PDSCH) data transmission;
   wherein the DMRS transmission comprises:
      a physical uplink shared channel (PUSCH) DMRS transmission; and
   wherein the ZP-DMRS comprises:
      a PDSCH ZP-DMRS.

3. The method of claim 2, further comprising:
   rate matching the PDSCH data transmission by precluding, from the PDSCH data transmission, one or more resource elements, of the full-duplex time-frequency resource, associated with the PDSCH ZP-DMRS,
      wherein the one or more resource elements are based at least in part on the time-frequency mapping of the PDSCH ZP-DMRS; and
   performing the PDSCH data transmission based at least in part on rate matching the PDSCH data transmission.

4. The method of claim 3, wherein rate matching the PDSCH data transmission by precluding one or more resource elements from the PDSCH data transmission comprises:
   determining a rate matching output length, for the PDSCH data transmission, based at least in part on refraining from mapping coded bits, associated with the PDSCH ZP-DMRS, to the one or more resource elements.

5. The method of claim 1,
   wherein the data transmission comprises:
      a physical uplink shared channel (PUSCH) data transmission;
   wherein the DMRS transmission comprises:
      a physical downlink shared channel (PDSCH) DMRS transmission; and
   wherein the ZP-DMRS comprises:
      a PUSCH ZP-DMRS.

6. The method of claim 5, further comprising:
   receiving the PUSCH data transmission from the wireless communication device,
      wherein the PUSCH data transmission is rate matched such that one or more resource elements of the full-duplex time-frequency resource, associated with the PUSCH ZP-DMRS, are precluded from the PUSCH data transmission, and
      wherein the one or more resource elements are based at least in part on the time-frequency mapping of the PUSCH ZP-DMRS; and
   rate dematching the PUSCH data transmission based at least in part on the one or more resource elements being precluded from the PUSCH data transmission.

7. The method of claim 6, wherein rate dematching the PUSCH data transmission comprises:
   determining a rate dematching output length, for the PUSCH data transmission, based at least in part on refraining from mapping coded bits, associated with the PUSCH ZP-DMRS, from the one or more resource elements.

8. The method of claim 5, further comprising:
identifying another collision between a PDSCH data transmission and another DMRS transmission in the full-duplex time-frequency resource,
  wherein the other DMRS transmission comprises:
    a PUSCH DMRS transmission; and
transmitting, to another wireless communication device, an indication of a time-frequency mapping for a PDSCH ZP-DMRS in the full-duplex time-frequency resource,
  wherein the time-frequency mapping for the PDSCH ZP-DMRS, and a time-frequency mapping in the full-duplex time-frequency resource for the other DMRS transmission, are a same time-frequency mapping.

9. The method of claim 8,
wherein the network entity comprises:
  an integrated access and backhaul (IAB) node;
wherein the wireless communication device comprises:
  a user equipment or a child IAB node; and
wherein the other wireless communication device comprises:
  an IAB donor or a parent IAB node.

10. The method of claim 8,
wherein the network entity comprises:
  an integrated access and backhaul (IAB) node;
wherein the wireless communication device comprises:
  an IAB donor or a parent IAB node; and
wherein the other wireless communication device comprises:
  a user equipment or a child IAB node.

11. The method of claim 5, further comprising:
identifying another collision, between a PDSCH data transmission and another DMRS transmission, in the full-duplex time-frequency resource,
  wherein the other DMRS transmission comprises:
    a PUSCH DMRS transmission; and
transmitting, to the wireless communication device, an indication of a time-frequency mapping for a PDSCH ZP-DMRS in the full-duplex time-frequency resource,
  wherein the time-frequency mapping for the PDSCH ZP-DMRS, and a time-frequency mapping in the full-duplex time-frequency resource for the other DMRS transmission, are a same time-frequency mapping.

12. The method of claim 1, further comprising:
determining that the collision between the data transmission and the DMRS transmission is to result in interference that satisfies an interference threshold; and
wherein transmitting the indication of the time-frequency mapping for the ZP-DMRS comprises:
  transmitting the indication of the time-frequency mapping for the ZP-DMRS based at least in part on determining that the collision between the data transmission and the DMRS transmission is to result in interference that satisfies the interference threshold.

13. The method of claim 1, wherein the time-frequency mapping for the ZP-DMRS includes one or more resource elements, in the full-duplex time-frequency resource, associated with the ZP-DMRS.

14. The method of claim 13, wherein transmitting the indication of the time-frequency mapping for the ZP-DMRS comprises:
  transmitting an indication of at least one of:
    symbol indexes associated with the one or more resource elements,
    resource block indexes associated with the one or more resource elements,
    or resource element indexes associated with the one or more resource elements.

15. The method of claim 13, wherein transmitting the indication of the time-frequency mapping for the ZP-DMRS comprises:
  transmitting a bitmap that indicates respective locations of the one or more resource elements.

16. The method of claim 1, wherein the indication of the time-frequency mapping for the ZP-DMRS is included in a DMRS configuration for the DMRS transmission; and
wherein transmitting the indication of the time-frequency mapping for the ZP-DMRS comprises:
  transmitting an indication of the DMRS configuration to the wireless communication device.

17. The method of claim 16, wherein transmitting the indication of the DMRS configuration comprises:
  transmitting an indication of a first subset of parameters, included in the DMRS configuration, in a static or semi-static signaling communication; and
  transmitting an indication of a second subset of parameters, included in the DMRS configuration, in a dynamic signaling communication.

18. The method of claim 16, wherein transmitting the indication of the DMRS configuration comprises:
  transmitting an indication of a plurality of candidate DMRS configurations in a static or semi-static signaling communication; and
  transmitting, in a dynamic signaling communication, an indication of a selection of the DMRS configuration from the plurality of candidate DMRS configurations,
    wherein the dynamic signaling communication indexes into the plurality of candidate DMRS configurations.

19. A method of wireless communication performed by a wireless communication device, comprising:
receiving, from a network entity and based at least in part on a scheduling collision between a data transmission and a demodulation reference signal (DMRS) transmission in a full-duplex time-frequency resource, an indication of a time-frequency mapping for a zero-power DMRS (ZP-DMRS) in the full-duplex time-frequency resource,
  wherein the time-frequency mapping for the ZP-DMRS, and a time-frequency mapping in the full-duplex time-frequency resource for the DMRS transmission, are a same time-frequency mapping; and
rate matching the data transmission based at least in part on the time-frequency mapping for the ZP-DMRS, or
receiving the data transmission based at least in part on the data transmission being rate matched based at least in part on the time-frequency mapping for the ZP-DMRS.

20. The method of claim 19,
wherein the data transmission comprises:
  a physical downlink shared channel (PDSCH) data transmission;
wherein the DMRS transmission comprises:
  a physical uplink shared channel (PUSCH) DMRS transmission;
wherein the ZP-DMRS comprises:
  a PDSCH ZP-DMRS; and
wherein rate matching the data transmission based at least in part on the time-frequency mapping for the ZP-DMRS, or receiving the data transmission based at least in part on the data transmission being rate matched based at least in part on the time-frequency mapping for the ZP-DMRS, comprises:
receiving the PDSCH data transmission based at least in part on the PDSCH data transmission being rate matched based at least in part on the time-frequency mapping for the PDSCH ZP-DMRS.

21. The method of claim 20, wherein the PDSCH data transmission is rate matched such that one or more resource elements of the full-duplex time-frequency resource, associated with the PDSCH ZP-DMRS, are precluded from the PDSCH data transmission,
wherein the one or more resource elements are based at least in part on the time-frequency mapping of the PDSCH ZP-DMRS; and
wherein the method further comprises:
rate dematching the PDSCH data transmission based at least in part on the one or more resource elements being precluded from the PDSCH data transmission.

22. The method of claim 21, wherein rate dematching the PDSCH data transmission comprises:
determining a rate dematching output length, for the PDSCH data transmission, based at least in part on refraining from mapping coded bits, associated with the PDSCH ZP-DMRS, from the one or more resource elements.

23. The method of claim 19, wherein the data transmission comprises:
a physical uplink shared channel (PUSCH) data transmission;
wherein the DMRS transmission comprises:
a physical downlink shared channel (PDSCH) DMRS transmission;
wherein the ZP-DMRS comprises:
a PUSCH ZP-DMRS; and
wherein rate matching the data transmission based at least in part on the time-frequency mapping for the ZP-DMRS, or receiving the data transmission based at least in part on the data transmission being rate matched based at least in part on the time-frequency mapping for the ZP-DMRS, comprises:
rate matching the PUSCH data transmission based at least in part on the time-frequency mapping for the PUSCH ZP-DMRS.

24. The method of claim 23, wherein rate matching the PUSCH data transmission based at least in part on the time-frequency mapping for the PUSCH ZP-DMRS comprises:
precluding, from the PUSCH data transmission, one or more resource elements, of the full-duplex time-frequency resource, associated with the PUSCH ZP-DMRS,
wherein the one or more resource elements are based at least in part on the time-frequency mapping of the PUSCH ZP-DMRS; and
wherein the method further comprises:
performing the PUSCH data transmission based at least in part on rate matching the PUSCH data transmission.

25. The method of claim 24, wherein precluding the one or more resource elements from the PUSCH data transmission comprises:
determining a rate matching output length, for the PUSCH data transmission, based at least in part on refraining from mapping coded bits, associated with the PUSCH ZP-DMRS, from the one or more resource elements.

26. The method of claim 23, further comprising:
receiving, based at least in part on a scheduling collision between a PDSCH data transmission and a PUSCH DMRS transmission in the full-duplex time-frequency resource, an indication of a time-frequency mapping for a PDSCH ZP-DMRS in the full-duplex time-frequency resource,
wherein the time-frequency mapping for the PDSCH ZP-DMRS, and a time-frequency mapping in the full-duplex time-frequency resource for the PUSCH DMRS transmission, are a same time-frequency mapping; and
receiving the PDSCH data transmission based at least in part on the PDSCH data transmission being rate matched based at least in part on the time-frequency mapping for the PDSCH ZP-DMRS.

27. The method of claim 19,
wherein the wireless communication device comprises:
an integrated access and backhaul (IAB) donor,
an IAB node, or
a user equipment; and
wherein the network entity comprises:
an IAB node.

28. The method of claim 19, wherein the time-frequency mapping for the ZP-DMRS includes one or more resource elements, in the full-duplex time-frequency resource, associated with the ZP-DMRS.

29. The method of claim 28, wherein receiving the indication of the time-frequency mapping for the ZP-DMRS comprises:
receiving an indication of at least one of:
symbol indexes associated with the one or more resource elements,
resource block indexes associated with the one or more resource elements,
or resource element indexes associated with the one or more resource elements.

30. The method of claim 19, wherein the indication of the time-frequency mapping for the ZP-DMRS is included in a DMRS configuration for the DMRS transmission; and
wherein receiving the indication of the time-frequency mapping for the ZP-DMRS comprises:
receiving an indication of the DMRS configuration from the network entity.

31. The method of claim 30, wherein receiving the indication of the DMRS configuration comprises:
receiving an indication of a first subset of parameters, included in the DMRS configuration, in a static or semi-static signaling communication; and
receiving an indication of a second subset of parameters, included in the DMRS configuration, in a dynamic signaling communication.

32. The method of claim 30, wherein receiving the indication of the DMRS configuration comprises:
receiving an indication of a plurality of candidate DMRS configurations in a static or semi-static signaling communication; and
receiving, in a dynamic signaling communication, an indication of a selection of the DMRS configuration from the plurality of candidate DMRS configurations,
wherein the dynamic signaling communication indexes into the plurality of candidate DMRS configurations.

33. A network entity for wireless communication, comprising:
one or more memories; and
one or more processors, coupled to the one or more memories, configured to:

identify a collision between a data transmission and a demodulation reference signal (DMRS) transmission in a full-duplex time-frequency resource; and determine a time-frequency mapping for a zero-power DMRS (ZP-DMRS) in the full-duplex time-frequency resource based at least in part on the identified collision;

transmit, to a wireless communication device, an indication of the time-frequency mapping for the ZP-DMRS in the full-duplex time-frequency resource, wherein the time-frequency mapping for the ZP-DMRS, and a time-frequency mapping in the full-duplex time-frequency resource for the DMRS transmission, are a same time-frequency mapping.

34. A wireless communication device for wireless communication, comprising:

one or more memories; and one or more processors, coupled to the one or more memories configured to:

receive, from a network entity and based at least in part on a scheduling collision between a data transmission and a demodulation reference signal (DMRS) transmission in a full-duplex time-frequency resource, an indication of a time-frequency mapping for a zero-power DMRS (ZP-DMRS) in the full-duplex time-frequency resource, wherein the time-frequency mapping for the ZP-DMRS, and a time-frequency mapping in the full-duplex time-frequency resource for the DMRS transmission, are a same time-frequency mapping; and rate matching the data transmission based at least in part on the time-frequency mapping for the ZP-DMRS, or receive, the data transmission based at least in part on the data transmission being rate matched based at least in part on the time-frequency mapping for the ZP-DMRS.

35. The wireless communication device of claim 34, wherein the ZP-DMRS is configured to replace the data transmission.

36. An apparatus for wireless communication, comprising:

means for identifying a collision between a data transmission and a demodulation reference signal (DMRS) transmission in a full-duplex time-frequency resource; and means for determining a time-frequency mapping for a zero-power DMRS (ZP-DMRS) in the full-duplex time-frequency resource based at least in part on the identified collision;

means for transmitting, to a wireless communication device, an indication of the time-frequency mapping for the ZP-DRMS in the full-duplex time-frequency resource, wherein the time-frequency mapping for the ZP-DMRS, and a time-frequency mapping in the full-duplex time-frequency resource for the DMRS transmission, are a same time-frequency mapping.

* * * * *